(12) United States Patent
Madaelil et al.

(10) Patent No.: US 12,353,881 B2
(45) Date of Patent: Jul. 8, 2025

(54) CIRCUITRY AND METHODS FOR POWER EFFICIENT GENERATION OF LENGTH MARKERS FOR A VARIABLE LENGTH INSTRUCTION SET

(71) Applicant: Intel Corporation, Santa Clara, CA (US)

(72) Inventors: Thomas Madaelil, Austin, TX (US); Jonathan Combs, Austin, TX (US); Khary Alexander, Cedar Park, TX (US); Martin Licht, Round Rock, TX (US); Vikash Agarwal, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 17/033,680

(22) Filed: Sep. 26, 2020

(65) Prior Publication Data

US 2022/0100516 A1  Mar. 31, 2022

(51) Int. Cl.
*G06F 9/30* (2018.01)
*G06F 9/38* (2018.01)
*G06F 12/0875* (2016.01)

(52) U.S. Cl.
CPC ...... *G06F 9/30149* (2013.01); *G06F 9/30152* (2013.01); *G06F 9/3016* (2013.01); *G06F 9/382* (2013.01); *G06F 12/0875* (2013.01); *G06F 2212/452* (2013.01)

(58) Field of Classification Search
CPC ............. G06F 9/30145; G06F 9/30149; G06F 9/30152; G06F 9/382; G06F 9/3816
See application file for complete search history.

(56) References Cited

U.S. PATENT DOCUMENTS

| 5,488,710 A | * | 1/1996 | Sato ..................... G06F 9/30152 712/213 |
| 5,941,980 A | * | 8/1999 | Shang ................. G06F 9/30152 712/213 |

(Continued)

FOREIGN PATENT DOCUMENTS

TW  201905702 A  2/2019

OTHER PUBLICATIONS

International Search Report and Written Opinion, PCT App. No. PCT/US21/47823, Nov. 23, 2021, 8 pages.

(Continued)

*Primary Examiner* — Andrew Caldwell
*Assistant Examiner* — Kasim Alli
(74) *Attorney, Agent, or Firm* — NICHOLSON DE VOS WEBSTER & ELLIOTT LLP

(57) ABSTRACT

Systems, methods, and apparatuses for power efficient generation of length markers for a variable length instruction set are described. In one embodiment, a hardware processor core includes a decoder circuit to decode instructions into decoded instructions, an execution circuit to execute the decoded instructions, an instruction cache, an instruction length decoder circuit, a predecode cache comprising a predecode bit, for each section of multiple sections of instruction data, that indicates when that section is identified as an end boundary of a variable length instruction, an incomplete decode table comprising a bit, for each proper subset of sections of instruction data, that indicates when that proper subset of sections has one or more invalid predecode bits in the predecode cache; and a fetch circuit to, for an incoming address of instruction data, perform a lookup in the instruction cache and the incomplete decode table, and, when there is a hit in the instruction cache for the instruction data at the incoming address and a hit in the (Continued)

incomplete decode table that indicates a proper subset of sections of the instruction data for the incoming address has one or more invalid predecode bits in the predecode cache, causes the instruction length decoder circuit to generate one or more predecode bits for the proper subset of sections of the instruction data for the incoming address that has the one or more invalid predecode bits.

24 Claims, 19 Drawing Sheets

(56) References Cited

U.S. PATENT DOCUMENTS

| | | | |
|---|---|---|---|
| 6,041,405 A * | 3/2000 | Green | G06F 9/382 |
| | | | 712/213 |
| 6,092,182 A | 7/2000 | Mahalingaiah | |
| 7,305,542 B2 | 12/2007 | Madduri | |
| 7,681,013 B1 | 3/2010 | Trivedi et al. | |
| 2007/0260854 A1 | 11/2007 | Smith et al. | |
| 2013/0262771 A1* | 10/2013 | Galan | G06F 9/382 |
| | | | 711/125 |
| 2014/0281246 A1* | 9/2014 | Breternitz, Jr. | G06F 9/30152 |
| | | | 711/125 |
| 2019/0020360 A1 | 1/2019 | Balasubramanian et al. | |
| 2020/0159677 A1 | 5/2020 | Evans et al. | |

OTHER PUBLICATIONS

Office Action, TW App. No. 110130686, Dec. 26, 2024, 16 pages (09 pages of English Translation and 07 pages of Original Document).

* cited by examiner

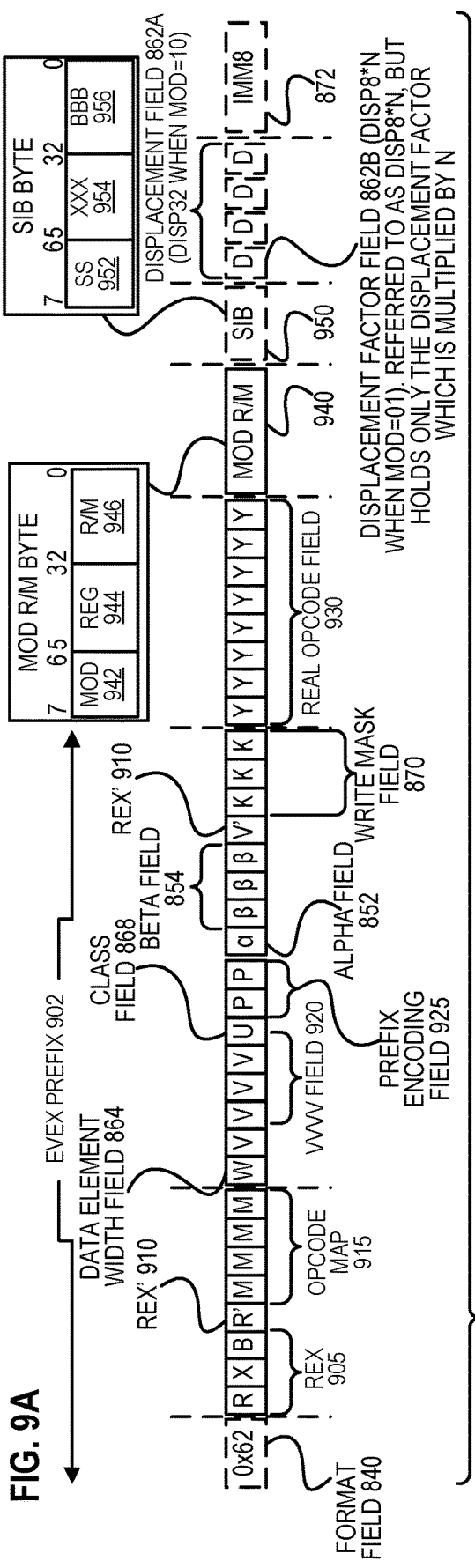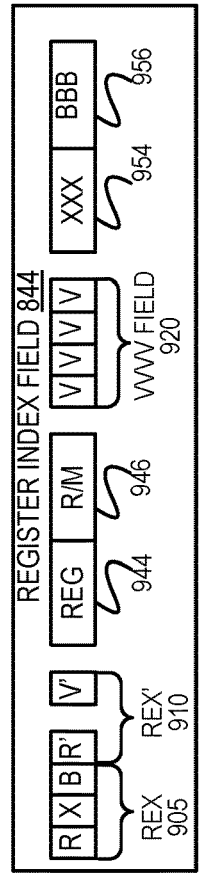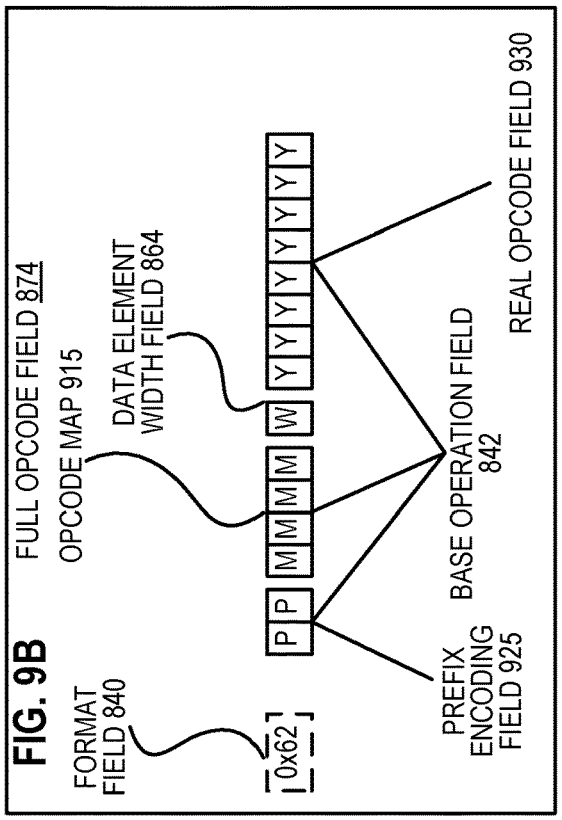

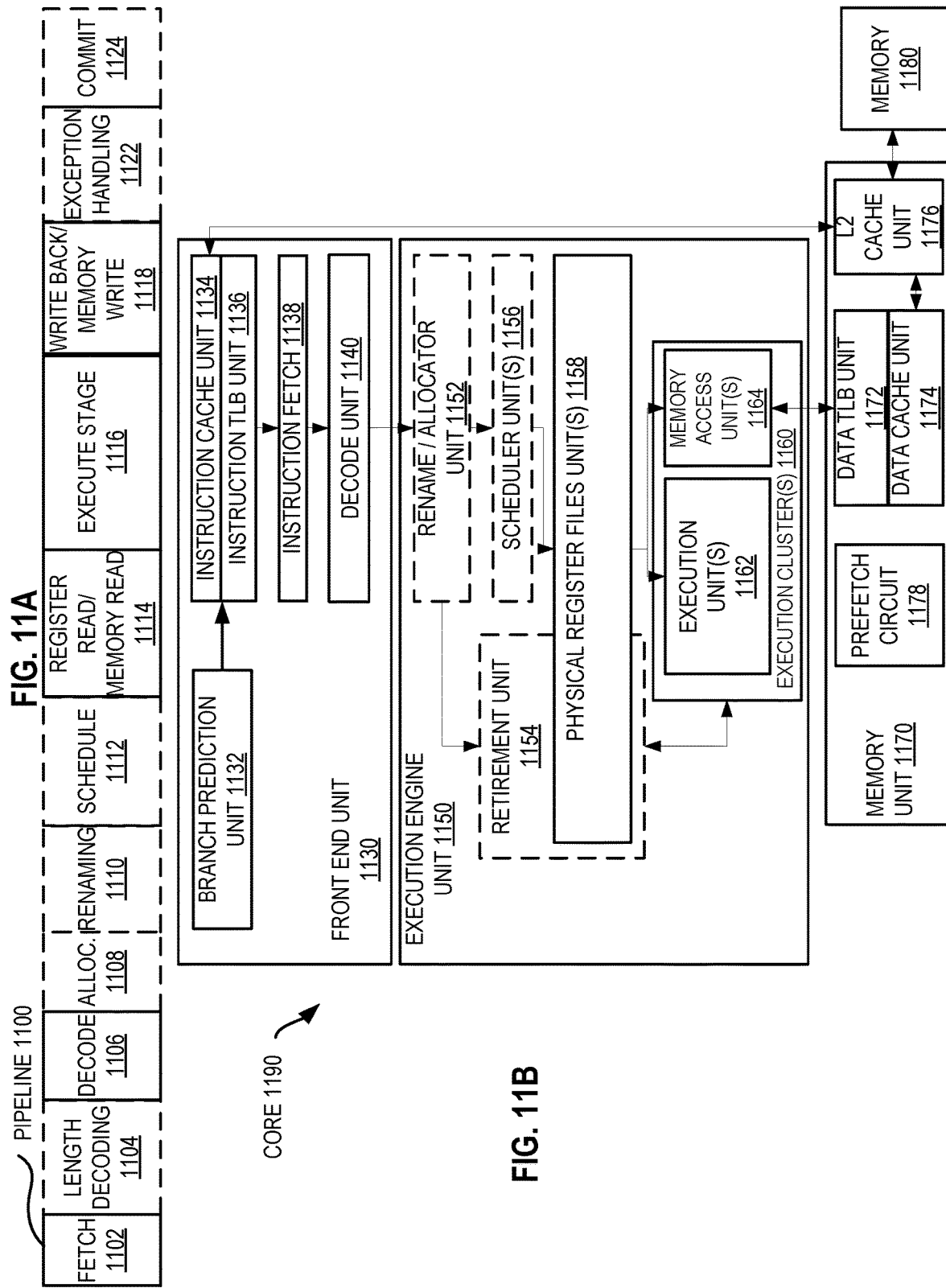

CIRCUITRY AND METHODS FOR POWER EFFICIENT GENERATION OF LENGTH MARKERS FOR A VARIABLE LENGTH INSTRUCTION SET

TECHNICAL FIELD

The disclosure relates generally to electronics, and, more specifically, an embodiment of the disclosure relates to circuitry for power efficient generation of length markers for a variable length instruction set.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating fields for the generic vector friendly instruction formats in FIGS. 8A and 8B according to embodiments of the disclosure.

FIG. 9B is a block diagram illustrating the fields of the specific vector friendly instruction format in FIG. 9A that make up a full opcode field according to one embodiment of the disclosure.

FIG. 9C is a block diagram illustrating the fields of the specific vector friendly instruction format in FIG. 9A that make up a register index field according to one embodiment of the disclosure.

FIG. 11A is a block diagram illustrating both an exemplary in-order pipeline and an exemplary register renaming, out-of-order issue/execution pipeline according to embodiments of the disclosure.

FIG. 11B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
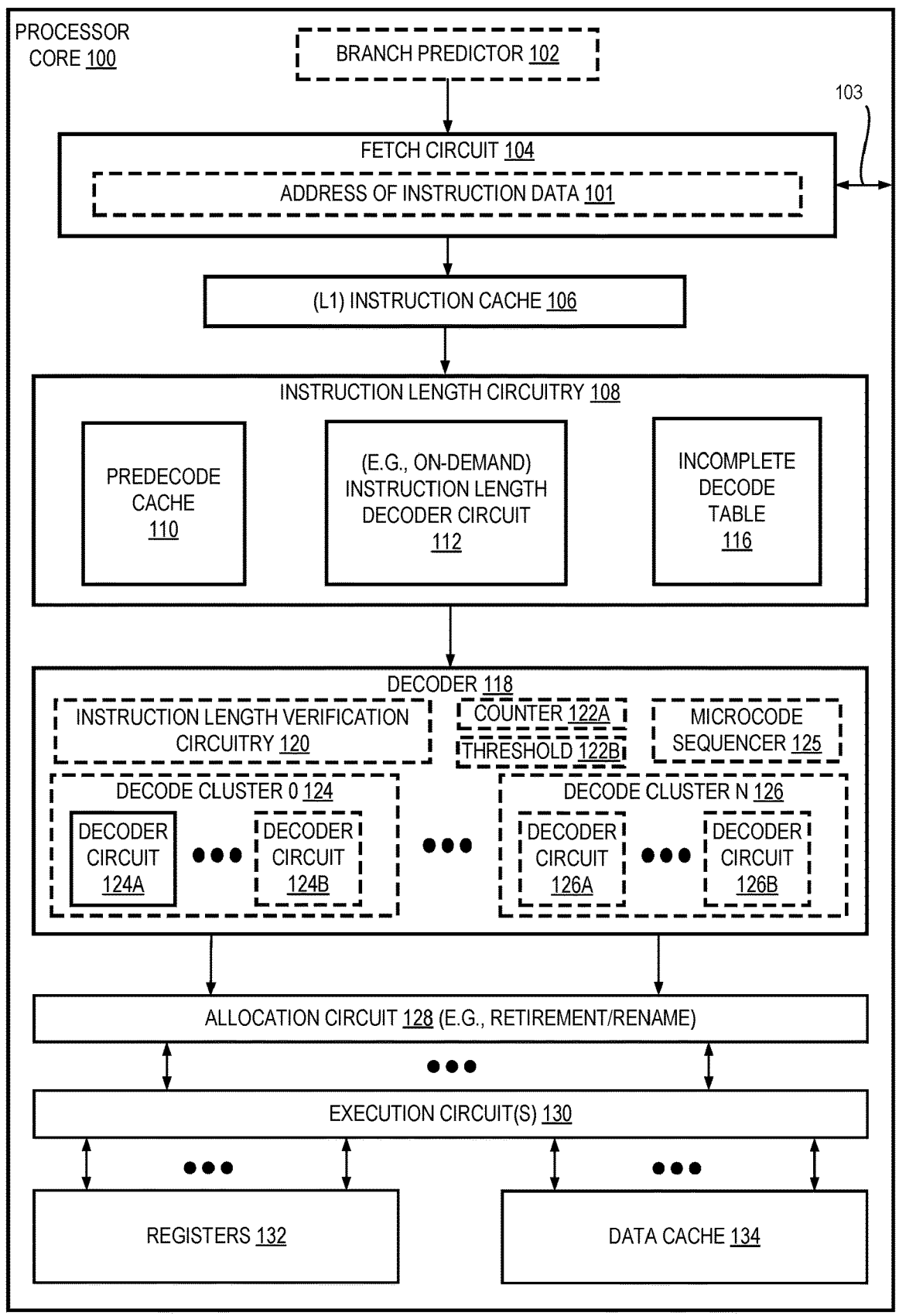
FIG. 1 illustrates a block diagram of a processor core having instruction length circuitry according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a macro-instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (μops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are (e.g., 64 bit and/or 32 bit) instructions of an instruction set architecture (ISA), e.g., an Intel® ISA.

Certain ISAs include instructions (e.g., the instruction data itself and not the operands to be operated on by the instruction) that vary in length. Such variable length instructions may be from a complex instruction-set computing (CISC) architecture. Additionally or alternatively, may be stored in an unaligned manner (e.g., in memory or in an instruction cache) before being decoded and executed. In certain embodiments, the length (e.g., bit width) of the instructions (e.g., the beginning and/or end of the instruction) is first determined before decoding of the instruction, e.g., in order to properly align the instruction for execution.

Example instruction formats are discussed below in reference to FIG. 9A. One example format of an instruction includes a prefix field (e.g., 0-4 Bytes (B)), an opcode field (e.g., 1-3 Bytes), a MOD/RM field (e.g., 0 or 1 Byte), a SIB field (e.g., 0 or 1 Byte), a displacement field (e.g., 0, 1, 2, or 4 Bytes), and an immediate field (e.g., 0, 1, 2, or 4 Bytes). Thus, an instruction according to this format may have different widths depending on which fields are included and/or which width granularities are used for included fields.

In certain embodiments, the prefix appears before the opcode and may override various default attributes associated with the opcode. For example, a prefix may override the default size of the operand, the default size of the address specifier, and/or the default segment. Furthermore, the prefix may indicate a string instruction loop and/or indicate a bus lock cycle while executing an instruction. Prefixes that affect the length decoding of instruction may include the overriding address size prefix, the overriding operand size prefix, and the repeat prefix. In certain embodiments, the operand size override prefix may alter the default size of an operand associated with an instruction. For example, a 16-bit instruction containing the operand size override prefix may contain a 32-bit operand instead of the default 16-bit operand. Conversely, a 32-bit instruction containing the operand size override prefix may contain a 16-bit operand instead of the default 32-bit operand. In certain embodiments, the address size override prefix may alter the default size of the address associated with the instruction. For example, a 16-bit instruction containing the address size override prefix may contain a 32-bit address instead of the default 16-bit address. Conversely, a 32-bit instruction containing the address size override prefix may contain a 16-bit address instead of the default 32-bit address.

In certain embodiments, the opcode identifies the operation to be performed by the instruction. The opcode may specify the number of immediate bytes, presence of the MOD/RM field, and/or displacement bytes. For example, an opcode may specify (e.g., up to 8) displacement bytes and/or (e.g., up to 8) immediate bytes in certain embodiments.

In certain embodiments, the MOD/RM byte indicates the type of source and/or destination operands that are to be used in conjunction with an instruction. For example, the MOD/RM byte may indicate the existence within the instruction (e.g., of up to four) displacement bytes or a scale index (SIB) byte.

In certain embodiments, the SIB byte indicates other complex addressing modes. For example, the SIB byte may specify (e.g., up to four) displacement bytes.

Where one or more (e.g., each) instruction may vary in length (e.g., according to the above fields), in certain embodiments it is necessary to first determine the length (e.g., beginning and/or end) of the instruction before it can be decoded and subsequently executed by a processor.

In certain embodiments, an instruction length decoder is utilized to generate a (e.g., prediction) of the length of an instruction, for example, by generating an indication (e.g., which may be referred to as hint bits or predecode bits) of the length of the instruction. To efficiently decode multiple instructions per cycle (e.g., per decode cluster), certain embodiments of a decoder uses the indications (e.g., predecode bits) to mark the boundaries between the variable length (e.g., x86) instructions. In certain embodiments, the instruction length decode generates the indications, e.g., before the instruction is decoded (e.g., decoded into one or more micro-operations). In certain embodiments, the indications of the length are corresponding bits that indicate a boundary between variable length instructions in (e.g., raw) instruction data, for example, a cache line (e.g., 64 Bytes) of instruction data that may include one or a plurality of instructions therein. In certain embodiments, the indication is a predecode bit that indicates a corresponding part of the instruction data (e.g., a particular section (e.g., Byte) of multiple sections (e.g., 64 sections) of the instruction data) is an end (or beginning) of the instruction, for example, a predecode bit that indicates an end of a macro-instruction (e.g., an EOM bit). In one embodiment, one predecode bit per section (e.g., byte) of raw instruction data (e.g., bytes) are cached (e.g., in a predecode cache) alongside (or part of) an (e.g., first level (L1)) instruction cache. In certain embodiments, the predecode bits are consumed in a single cycle loop at the beginning of each decoder (e.g., decode cluster) to steer a set of raw contiguous instruction sections (e.g., bytes) to parallel decoder circuits to complete the multi-cycle (e.g., 2, 3, 4, etc. cycle total) instruction decode process.

Note that in certain embodiments, the predecode bits are not required to be correct (e.g., they can be wrong by being in the wrong locations). In certain embodiments, all predecode bits could begin at a state of all being a first value (e.g., a zero indicating a corresponding section of the instruction data is not an end of an instruction or a one indicating a corresponding section of the instruction data is an end of an instruction) or a random collection of first values (e.g., zeros) and second values (e.g., ones), for example, and certain microarchitecture will still make forward progress, e.g., because (e.g., all) predicted instruction lengths are verified during the decode pipeline such that the true length is (e.g., always) computed and verified against the predicted length. However, in certain embodiments without predecode (e.g., hint) bits to enable parallel decode, decode falls from supporting a plurality of (e.g., 3) instructions per cycle (e.g., per cluster) to supporting only one instruction every plurality of (e.g., 3) cycles per cluster. In certain embodiments, at the end of the decode pipeline the true lengths of each instruction are resolved, so such true lengths (e.g., the true EOM) can be used to resteer the decode pipeline to properly decode each instruction as necessary and/or update corresponding predecode bits in a predecode cache(s).

In certain embodiments, one predecode bit is included per section (e.g., byte) of instruction data, e.g., and the predecode bit (e.g., predecode cache storing those bits) can be attached to an (first level (L1)) instruction cache for this process to work. To improve performance, though, in certain embodiments, a second level predecode cache is utilized, e.g., a (e.g., 128 KB) second level predecode cache built as a physically hashed structure attached to a large (e.g., up to 4 MB) second level (L2) cache. In certain embodiments, misses in the L1 instruction cache index into this second level predecode cache in parallel to the lookup to the L2 cache. In certain embodiments, this second level predecode cache is an untagged structure indexed via a physical address hash function, e.g., because it is untagged it always produces a result. Regardless of whether the L2 cache hit or missed for the (e.g., cache line) (e.g., 64B) instruction data, in certain embodiments, the predecode cache provides (e.g., 64 bits of) the predecode bits for the requested instruction data. In certain embodiments, each time there is an update to a first level predecode cache, the same update would be shuttled to the shared 2nd level predecode cache.

In certain embodiments, when a portion of code (for example, instruction data, e.g., the ones and zeros that define the instruction itself and not the operands) is decoded for the very first time, predecode bits for this code have not been generated, e.g., and the corresponding predecode bits provided by the (e.g., second level) predecode cache, therefore will likely be incorrect (e.g., and each decode cluster may be incapable of parallel decode). In certain embodiments (e.g., where the code footprint is large), even though instructions have been decoded (e.g., once) before, the (e.g., 2nd level) predecode cache can be overwhelmed such that it will be incorrect.

In certain embodiments, an alternative front-end pipeline that avoids the need for caching predecode bits is built by preceding the instruction decode pipeline with a block of circuitry that explicitly extracts instruction length information e.g., the circuitry being an instruction length decoder (ILD). In certain embodiments, the ILD logic circuitry is computationally difficult where it scans through raw instruction data (e.g., bytes) speculatively assuming every section (e.g., byte) may be the beginning of an instruction. In one embodiment, this is pipelined using a cascade of logic circuitry with feedback loops. In certain embodiments, an ILD inputs a plurality of sections (e.g., 16 or 32 Bytes) and takes a plurality of (e.g., 2-5) cycles to process those sections. To counteract the long latencies, low bandwidth, and high capacitance (e.g., power consumption) associated with this decode, certain embodiments use a fully decoded cache (e.g., decoded stream buffer (DSB)) (e.g., storing micro-operations for instructions that have already been decoded). However, using a decoded cache generally comes at an increased area cost and creates its own issues around cold code starts and large code footprints where decoded caches only hold a fraction of the instructions held in the first level instruction caches. In certain embodiments, a decoded cache has poor performance when the decoded cache is insufficient or cold.

In certain embodiments, a predecode cache only solution has poor performance when the predecode cache is insufficient or cold. In certain embodiments, an ILD-only solution suffers from low bandwidth, high latency, and high power.

To overcome the above issues, certain embodiments herein combine usage of an instruction length decoder and a predecode cache. In certain embodiments, the ILD is an on-demand ILD (OD-ILD) that is switchable between an enabled (e.g., on) state and a disabled (e.g., off) state, for example, to merge the power and area benefits of a predecode cache while extracting the performance benefits of an OD-ILD pipeline for cold code starts and/or large code footprint scenarios. Certain embodiments herein include a front-end with multiple OD-ILDs, e.g., with one or more OD-ILDs for each decode cluster and/or core, or a front-end with a single OD-ILD for a single decode cluster or a single OD-ILD shared by a plurality of decode clusters.

In certain embodiments, when the predecode cache is unable to provide correct predecode bit(s), the OD-ILD is selectively engaged to generate bits, e.g., only when necessary. This removes the power and latency of an ILD pipeline for certain execution scenarios. Certain embodiments herein are directed to determining when to engage and when to disengage the OD-ILD. In one embodiment, the OD-ILD is engaged on (e.g., L1) instruction cache misses (e.g., where there is no L2 predecode cache). In certain embodiments, the OD-ILD (e.g., pipeline) disengages once the predecode cache is warm removing both the power and latency from the pipeline. Embodiments herein remove the issues in predecode cache only pipelines that cause a loss of decode bandwidth while preserving the power characteristics of designs without an always alive preceding ILD pipeline and the area advantages of designs without fully decoded caches (e.g., μop caches/DSBs/trace caches, etc.). In certain embodiments, the inclusion of multiple OD-ILD pipelines per cluster and per core add some logic area within a core boundary, but the total area is smaller than using a (e.g., 128 KB) second level predecode cache.

FIG. 1 illustrates a block diagram of a processor core 100 having instruction length circuitry 108 according to embodiments of the disclosure. Depicted processor core 100 includes an optional branch predictor 102 (e.g., to predict one or more branches of the code (e.g., instructions) that are to be executed by the processor core 100. Depicted processor core 100 includes a fetch circuit 104 to fetch instruction data, for example, from memory via port 103, e.g., to access memory 1180 in FIG. 11B. In one embodiment, the fetch circuit 104 uses the address 101 (e.g., virtual address) of instruction data (e.g., program counter (PC) or instruction pointer (IP)) to check if a corresponding entry (e.g., mapping that address 101 to the corresponding instruction data stored at that address) containing the instruction data is already stored in (e.g., L1) instruction cache 106, for example, and if no, performing a memory access (e.g., page walk in a paged memory) (e.g., via memory port 103) to obtain the instruction data (e.g., cache line of instruction data) and if yes, passing that cached instruction data forward in the processor core 100, e.g., for eventual decode and execution. Instruction cache 106 may include an instruction cache tag and/or instruction translation lookaside buffer (TLB).

As discussed above, instruction data from instruction cache 106 may comprise multiple sections of raw instruction data, e.g., such that the boundaries of the instruction corresponding to address 101 are not necessarily known at that time. In certain embodiments, instruction length circuitry 108 is included, e.g., between the instruction cache 106 and decoder 118.

Figure 3:
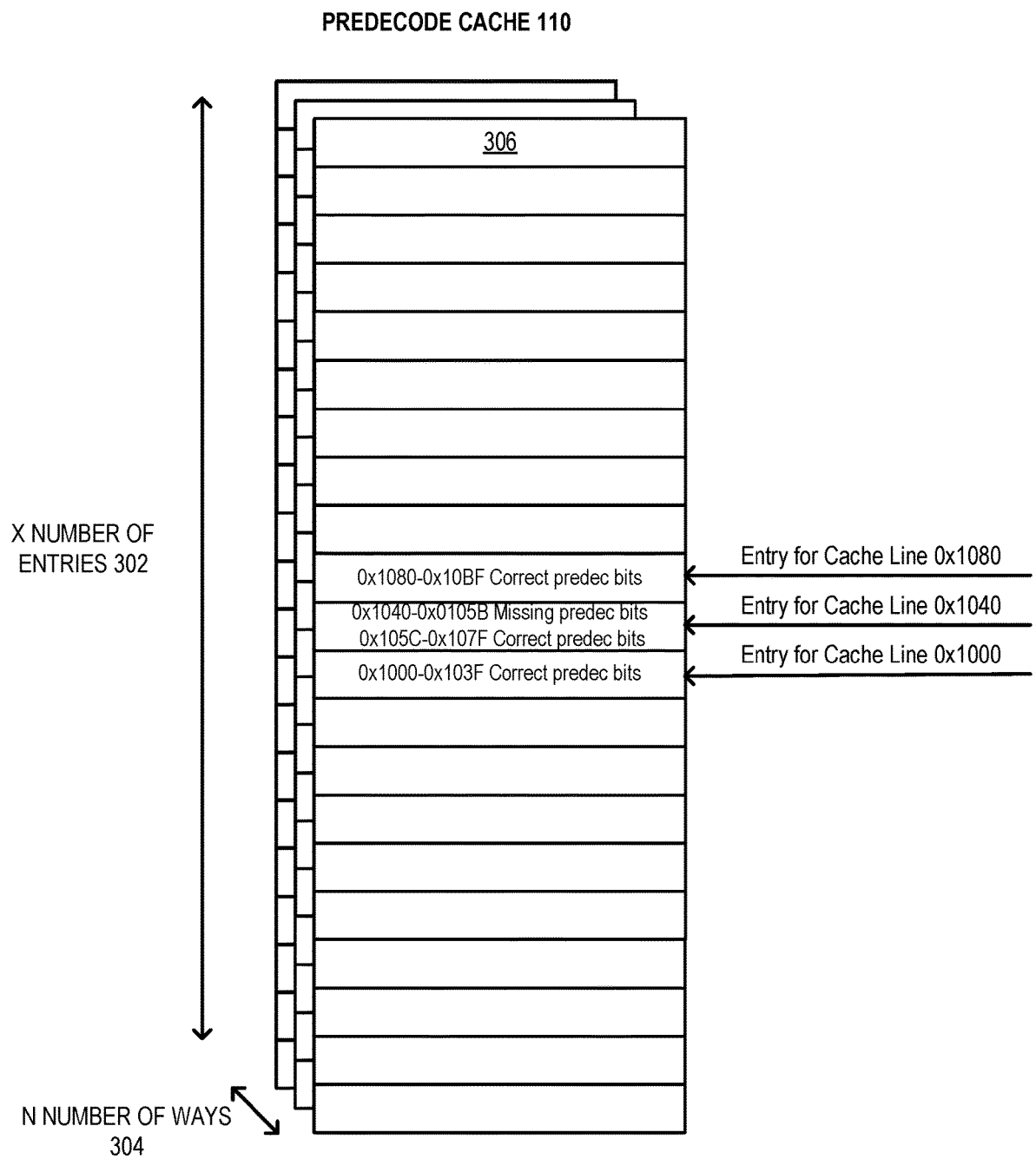
FIG. 3 is a block diagram illustrating an example format of a predecode cache according to embodiments of the disclosure.
Figure 5:
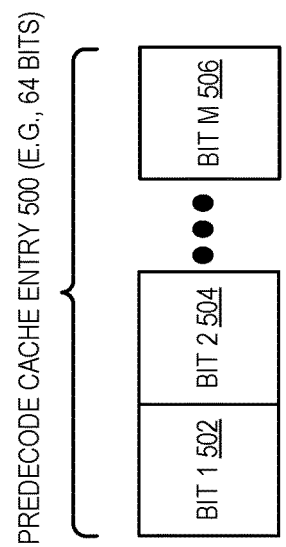
FIG. 5 illustrates an example format of a predecode cache entry according to embodiments of the disclosure.

Instruction length circuitry 108 may include a predecode cache 110 to store predecode bits, e.g., with each predecode bit indicating if a particular section (e.g., byte) of instruction data of multiple sections of instruction data in instruction cache (e.g., a cache line (e.g., 64 Bytes)) are identified as a boundary of an instruction (e.g., a macro-instruction boundary, e.g., an EOM). An example format for predecode cache 110 is depicted in FIG. 3 and an example predecode cache entry is depicted in FIG. 5.

Figure 6:
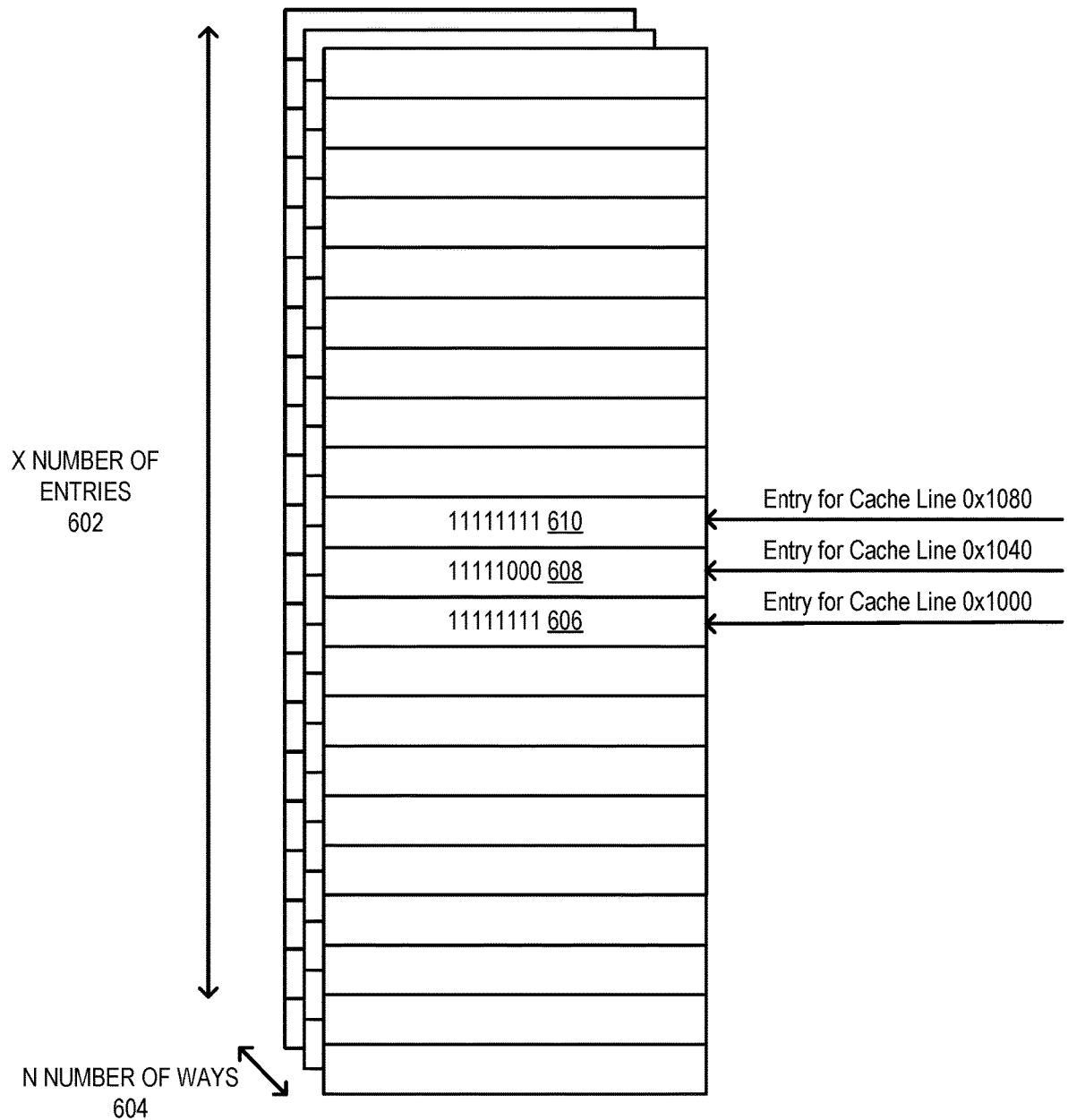
FIG. 6 is a block diagram illustrating an example format of an incomplete decode table according to embodiments of the disclosure.

Instruction length circuitry 108 may include an incomplete decode table 116 to store (e.g., incomplete decode indication) bits, e.g., with each bit indicating if a section (or a proper subset of sections) of instruction data (e.g., instruction data in instruction cache 106) has one or more invalid (e.g., stale) predecode bits in the predecode cache 110. An example format for incomplete decode table 116 is depicted in FIG. 6.

Instruction length circuitry 108 may include an instruction length decoder (ILD) circuit 112, for example, an on-demand instruction length decoder (OD-ILD) circuit 112 (for example, switchable between an enabled (e.g., on) state and a disabled (e.g., off) state, e.g., to conserve power).

In certain embodiments, a processor core 100 is to, for an input of an address 101 of instruction (e.g., program) data, search the instruction cache 106 for that address, and if a hit, pass that cached instruction data (e.g., which may include bits from more than one instruction) to instruction length circuitry 108 to indicate if one or more sections (e.g., bytes in one example granularity) of the cached instruction data are a boundary (e.g., end) of an instruction (e.g., a probable boundary in an embodiment where the inference is incorrect). In one embodiment, instruction length circuitry 108 is to first check if there are corresponding predecode bit or bits in predecode cache 110 that indicate one or more sections (e.g., bytes in one example granularity) of the cached instruction data are a boundary (e.g., end) of an instruction (e.g., a probable boundary in an embodiment where the inference is incorrect) and if the incomplete decode table 116 has one or more (e.g., incomplete decode indication) bits that indicate that at least one or more of those predecode bits are invalid (e.g., there are no current predecode bits in predecode cache 110 for the corresponding section(s) of the cached instruction data). In certain embodiments, if there are no invalid predecode bits (e.g., all those predecode bits are marked as valid), the instruction data from instruction cache (e.g., for a single instruction) and their corresponding predecode bit(s) are sent to decoder 118. In certain embodiments, if there are one or more invalid predecode bits (e.g., one or more predecode bits are marked as invalid), the instruction data from instruction cache is sent to instruction length decoder circuit 112 for instruction length decoding, e.g., and those predecode bits generated by that instruction length decoding are sent to decoder 118 and/or predecode cache 110 (e.g., with corresponding bit(s) set to valid in incomplete decode table 116).

Figure 2:
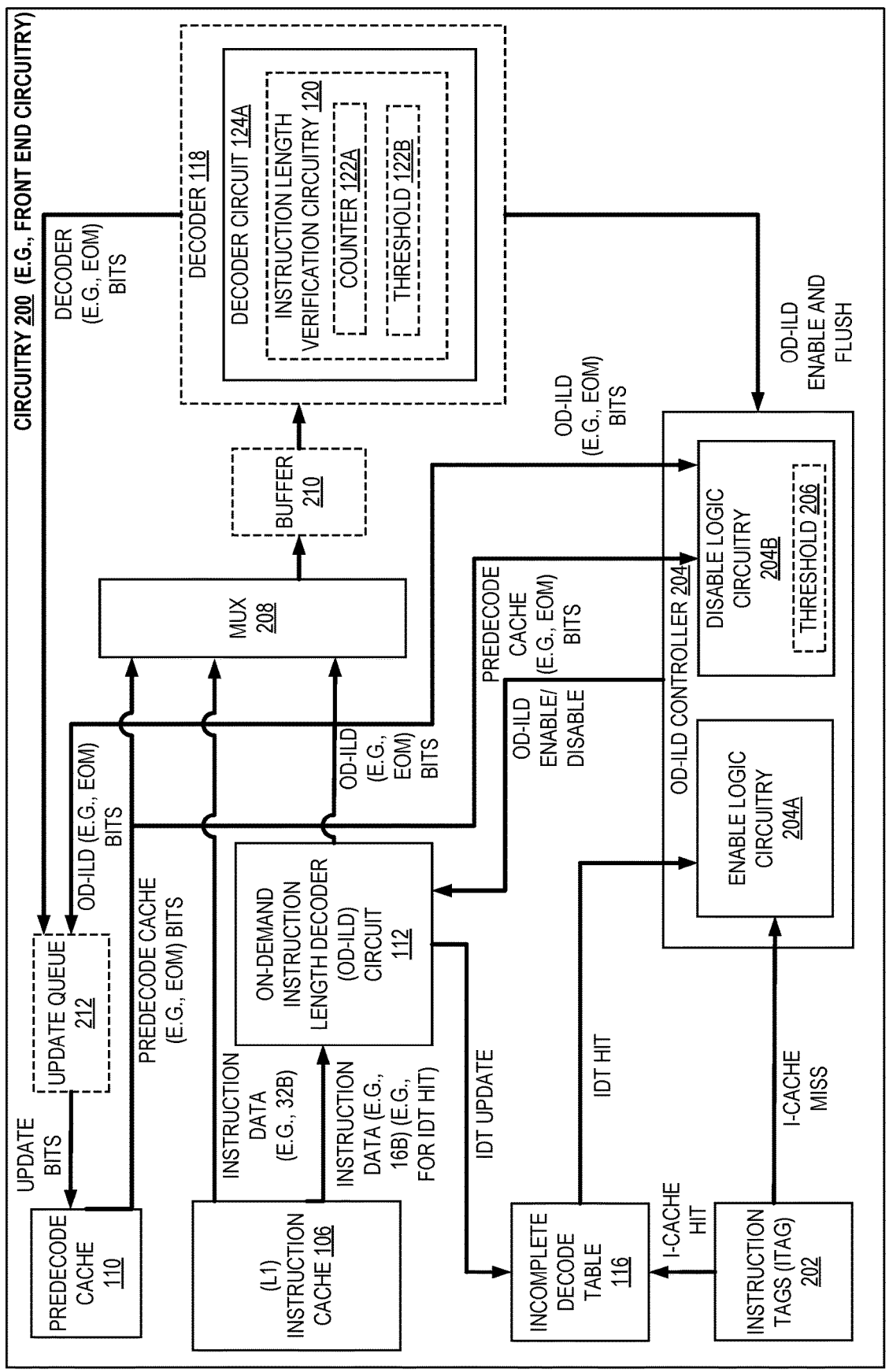
FIG. 2 illustrates a block diagram of circuitry to perform on-demand instruction length decoding according to embodiments of the disclosure.

In certain embodiments, an on-demand version of ILD circuit 112 is enabled (e.g., activated) when there is an (e.g., L1) instruction cache 106 miss, when predicting that instruction data (e.g., a cache line) within (e.g., L1) instruction cache 106 does not have predecode information (e.g., via a look-up in the incomplete decode table 116), and/or instruction length verification circuitry 120 (e.g., within the decoder 118) detects too many instructions with incorrect predecode bits, e.g., where counter 122A tracks the number of incorrect predecode bits from predecode cache 110 (e.g., or the corresponding number of instructions) in comparison to the output from instruction length verification circuitry 120, e.g., and activates the on-demand ILD circuit 112 when threshold 122B and/or flushes the fetch circuit 104 when threshold 122B is exceeded. Further examples of circuitry (e.g., components thereof) to perform on-demand instruction length decoding are depicted in FIG. 2.

Decoder 118 may be a single decoder circuit 124A, e.g., that generate corresponding micro-operation or micro-operations for a single instruction. Decoder 118 may include multiple clusters 124, 126 of decode clusters, e.g., each decode cluster having a plurality of decoder circuits in parallel. Although two are shown, three or more clusters may be utilized (e.g., where "N" is a positive integer greater than one). In certain embodiments, each decode cluster includes two or more (e.g., superscalar x86) instruction decoders capable of decoding different basic blocks of code out-of-order with respect to each other, for example, with decode cluster 124 including a first decoder circuit 124A and a second decoder circuit 124B (e.g., decoder), and decode cluster 126 including a first decoder circuit 126A and a second decoder circuit 126B.

In certain embodiments, once instructions are sent to their corresponding decode cluster 108A-108B (e.g., in instruction data queue in each decode cluster), decode clusters begin decoding the instructions in parallel (e.g., via the parallel decoder circuits therein). In certain embodiments, the allocation circuit 128 is responsible for allocating the operations (e.g., micro-operations) to the execution circuits 130 (e.g., execution units), e.g., in program order. Core 100 may also include a microcode sequencer 125 to load a corresponding set of one or more (e.g., plurality of) micro-operations (μops) from the microcode sequencer's memory (e.g., read-only memory (ROM)) into the decode pipeline (e.g., into the allocation circuit 128).

Execution circuits 130 may access storage, e.g., registers 132 and/or data cache 134 (e.g., one or more levels of a cache hierarchy). Once the resultants are generated by the execution circuits 130, a retirement circuit 128 may then retire a corresponding instruction.

FIG. 2 illustrates a block diagram of circuitry 200 to perform on-demand instruction length decoding according to embodiments of the disclosure. One or more components here may be duplicated for each decode cluster (e.g., or for each decoder circuit thereof). For example, decoder circuit 124A is depicted in FIG. 2, but one or more components of 200 may be duplicated (or shared) by other decoder circuits. For example, a processor core (e.g., may include a plurality of decode clusters fed by (e.g., a queue of) raw instruction data (e.g., instruction data bytes in cache line alignment). In one embodiment, each decode cluster can decode a plurality of (e.g., 3 or more) instructions per cycle (e.g., as the decode width of the cluster).

In certain embodiments, an on-demand instruction length decoder (OD-ILD) 112 is used to selectively generate predecode bits, e.g., end of macroinstruction (EOM) markers. The following discusses possible interactions between the OD-ILD 112, decoder circuit 124A (e.g., decoder 118), and predecode cache 110.

In certain embodiments, on-demand version of ILD circuit 112 is enabled (e.g., activated) when there is an (e.g., L1) instruction cache 106 miss, when predicting that instruction data (e.g., a cache line) within (e.g., L1) instruction cache 106 does not have predecode information (e.g., via a look-up in the incomplete decode table 116), and/or instruction length verification circuitry 120 (e.g., within the decoder circuit 124A) detects too many instructions with incorrect predecode bits, e.g., where counter 122A tracks the number of incorrect predecode bits from predecode cache 110 (e.g., or the corresponding number of instructions) in comparison to the output from instruction length verification circuitry 120, e.g., and activates the on-demand ILD circuit 112 when threshold 122B and/or flushes the predecode cache 110 when threshold 122B is exceeded.

Certain components may utilize data in a cache line width of granularity. For example, where a cache line is a block (e.g., Bytes) of memory that may be managed as a unit, e.g., for cache coherency purposes. A cache line of data may be stored in cache memory (e.g., of any level, such as, but not limited to, L1, L2, L3, L4, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and other memory, for example, to store (e.g., hold) currently active copies of cache lines (e.g., blocks from system (main) memory). Cache memory may be local to each processor. Additionally, or alternatively, cache memory may be shared by multiple processors, e.g., separate from each processor. System memory may be separate from any cache memory, e.g., system memory that is off-die relative to a processor core. Processing elements that use (e.g., share) a cache may be processor cores of a data processor and/or graphic processors. Cache line may refer to a 64-byte sized section of memory, e.g., 64 byte granularity. Cache line coherency may generally refer to each cache (e.g., cache memory) and/or system (e.g., main) memory in the coherence domain observing all modifications of that same cache line (e.g., that each instance of that cache line contains the same data). For example, a modification may be said to be observed by memory when any subsequent read would return the newly (e.g., current) written value.

In certain embodiments, for every entry in the (e.g., L1) instruction cache 106 (e.g., 64B) there is a corresponding entry in the (e.g., L1) predecode cache 110 (e.g., one bit in a predecode cache entry for each section (e.g., byte) of instruction data in a corresponding instruction cache entry, e.g., a single (e.g., 64 bit wide) entry in predecode cache 110 for each single entry (e.g., 64B of instruction data) in instruction cache 106. In certain embodiments, each entry is identified (e.g., indexed) by the address (or a proper subset of the address or addresses) of the corresponding instruction. In certain embodiments, when there is a miss in the (e.g., L1) instruction cache 106 for an input (e.g., an address for instruction data), OD-ILD circuit 112 is enabled. However, in order to decode any instruction, certain embodiments need a known (e.g., valid) starting point. For example, if the incoming address of the instruction that is to be processed is not aligned at the granularity of the data that is being loaded into the instruction cache 106 (e.g., the instruction address is in the middle of a cache line), certain embodiments begin (or "seed") the ILD circuit 112 (e.g., OD-ILD) at the target of the jump. For example, if you jumped to (hexadecimal) address 0x105C which is within the cache line (e.g., 64 Bytes) of instruction data that begins at address 0x1040 and ends at address 0x107F, certain embodiments herein start the (e.g., 16B wide) ILD circuit 112 (e.g., OD-ILD) with the section(s) (e.g., 16 Bytes) starting from address 0x1050 and at the starting offset address of 0xC. Thus, in certain embodiments, the ILD circuit 112 (e.g., OD-ILD) can then generate predecode bits from one or more instructions that start at 0x105C, e.g., and then proceed sequentially from there (e.g., but not for the sections of the cache line before 0x105C, i.e., not for instruction data from addresses 0x1040-0x105B).

However, in certain embodiments where full (e.g., cache line) predecode bit information about the multiple sections (e.g., bytes) of instruction data preceding 0x105C cannot be generated, later a walk can occur sequentially from cache line starting at address 0x1000 to the cache line starting at address 0x1040 with cache line starting at address 0x1040 hitting in the instruction cache 106 (e.g., as the cache line amount (e.g., 64 B) of instruction data starting at address 0x1040 is cached in instruction cache 106. In certain embodiments, the cache line of starting address 0x1040 has incomplete instruction length decode information as the predecode bits from 0x1040 through 0x105B are likely incorrect. In certain embodiments, the OD-ILD circuit 112 is engaged in this situation, e.g., assuming it is not already engaged.

In certain embodiments, an Incomplete instruction length Decode Table (IDT) (e.g., with one bit per byte covering the entire instruction cache 106) is included that specifies whether each section of instruction data (e.g., byte) has been instruction length decoded before, e.g., and the predecode cache 110 updated accordingly. By reading this new table in parallel with the instruction cache 106 and the predecode cache 110, certain embodiments herein determine if circuitry 200 (e.g., OD-ILD controller 204) is to engage the OD-ILD circuit 112 on instruction cache 106 hit cases. However, in other embodiments it is desirable to include a smaller version of the IDT 116, e.g., as a multiple (e.g., 32) entry and multiple (e.g., 4) way set associative table. See an example in FIG. 6. In certain embodiments, each entry in IDT table includes a (e.g., partial) tag and a plurality of (e.g., 8) bits of data, e.g., with each data bit represents a proper subset of section of instruction data, e.g., with each data bit representing a multiple (e.g., 8) byte region of a larger plurality of (e.g., 64) bytes of a cache line.

In certain embodiments, when an (L1) instruction cache 106 miss occurs, circuitry 200 (e.g., via OD-ILD controller 204) allocates an entry for that cache line in the IDT 116 (e.g., IDT update), for example, by replacing an invalid entry (e.g., an entry that has all of its data bits set to valid (e.g., set to one)) or via a (e.g., least recently used (LRU)) replacement policy. In certain embodiments, upon allocation, the data bits in an entry are cleared (e.g., set to zero) which specifies that no portion of the corresponding entry in the instruction cache 106 (e.g., cache line) has valid predecode bits. In certain embodiments, as updates to the predecode cache 110 occur (e.g., from OD-ILD circuit 112 and/or from updates triggered by one or more decoder circuits 124A (e.g., instruction length verification circuit 120 thereof), matching IDT 116 entries are updated for their affected region(s). In certain embodiments, circuitry 200, e.g., coupled to fetch circuit 104 in FIG. 1) looks up the IDT 116 in parallel with the instruction tag array 202 (ITAG). For example, perform a look-up based on the input address for a corresponding cache line. In certain embodiments, an IDT 116 hit (e.g., indicating invalid predecode bit(s) in predecode cache 110) that accompany an instruction cache 106 hit, engaged the OD-ILD circuit 112 to begin determining predecode bits (e.g., "OD-ILD (e.g., EOM) bits") for at least those corresponding section(s) of the instruction data (e.g., 16B of instruction data).

As mentioned previously, in certain embodiments, an ILD 112 requires a known good starting point in order to determine predecode bits (e.g., EOM markers). In certain embodiments, when walking sequentially through code and circuitry 200 (e.g., suddenly) decides to engage the OD-ILD circuit 112, the OD-ILD circuit 112 is to be "seeded" with a byte-wise starting point and code bytes from that location and sequentially forward. Using the prior example of cache line 0x1000 and cache line 0x1040, in certain embodiments this is the last (e.g., 16) bytes from cache line 0x1000 and its predecode bits. In an embodiment with an OD-ILD circuit 112 is 16 bytes wide, this would be the bytes from 0x1030. Certain embodiments herein provide for this by storing the last set of bytes and predecode bits delivered from the instruction cache 106 when the OD-ILD circuit 112 is disengaged in case it needs to become engaged while walking sequentially through the code bytes. Some embodiments may store these last set of bytes and predecode bits in storage elements within OD-ILD circuit 112 or within storage elements of decoder 118.

In certain embodiments, the circuitry 200 can enable the OD-ILD circuit 112, e.g., via enable logic circuitry 204A of OD-ILD controller 204. For example, enabling the OD-ILD circuit 112 to begin generating predecode bits for instruction data (e.g., from instruction cache 106) when a miss for an address in instruction tag 202 and/or when a hit in IDT 116 for a hit in instruction tag 202.

In certain embodiments, the decoder circuit 124A (e.g., decoder 118) itself can enable the OD-ILD circuit 112. For example, with the decoder circuit 124A (e.g., decoder 118) using a weighted counter 122A to track if a number of the recently decoded instructions have had incorrect predecode bits exceed a threshold 122B, e.g., and when the counter 122A exceeds the (e.g., programmable) threshold 122B, the decoder circuit 124A (e.g., decoder 118) sends a clear to the fetch circuit (e.g., a "BAClear") which restarts the fetch circuit, clears buffer 210, and/or causes engagement of the OD-ILD circuit 112.

In certain embodiments, while OD-ILD circuit 112 is engaged, all instruction bytes are processed by the OD-ILD circuit 112, e.g., to generate "OD-ILD (e.g., EOM) bits". In certain embodiments, the OD-ILD circuit 112 processes multiple (e.g., 16-bytes) sections of instruction data per cycle and generates predecode bits (e.g., EOM) markers for these sections (e.g., bytes), e.g., in multiple (e.g., 2) cycles. In certain embodiments, when the OD-ILD circuit 112 has generated the predecode bits for the instruction sections (e.g., bytes), the predecode cache 110 is updated with the generated bits (e.g., from update queue 212), the IDT 116 is updated, and the predecode bits are sent to the decoder (e.g., via multiplexer (mux) 208 so the decoder can begin decoding, e.g., decoding multiple instructions in parallel (e.g., from buffer 210). In certain embodiments, decoder 118 and the OD-ILD circuit 112 provide updates to the same portion of the predecode cache 110 in the same clock cycle creating a write conflict to the predecode cache. In this situation, certain embodiments queue the update from the OD-ILD circuit 112 and/or queue the update from the decoder 118 in update queue 212, e.g., where this queue has 1 to N (where N is a positive integer greater than 1) number of entries.

In certain embodiments, the decoder will not start decoding instruction sections (e.g., bytes) in this mode until the OD-ILD circuit 112 has produced predecode bits for those sections (e.g., bytes), e.g., where the decoder circuit 124A is to not start decoding the instruction bytes until the predecode bits are available. In certain embodiments, mux 208, e.g., via control by OD-ILD controller 204, is to send instruction data (e.g., 32B wide) and predecode bits (e.g., via predecode cache 110 or OD-ILD circuit 122) to decoder circuit 124A (e.g., decoder 118).

In certain embodiments, to disengage the OD-ILD circuit 112, the circuitry 200 (e.g., disable logic circuitry 204B of OD-ILD controller 204) compares the contents of the predecode cache 110 to the predecode bits generated by the OD-ILD circuit, for example, where when the predecode cache's predecode bits match the OD-ILD circuit 112 generated bits for a programmable number (e.g., threshold 206) of (e.g., consecutive) cycles, the OD-ILD circuit 112 is disengaged, e.g., removing any cycles of latency in the pipeline from the OD-ILD circuit 112.

In certain embodiments, such circuitry 200 is used with a microarchitecture that does not require predecode bits to be correct, e.g., the predecode bits from OD-ILD circuit 112 are allowed to be incorrect and/or incomplete. For example, certain (e.g., uncommon) prefixes within an ISA can trigger differences in the lengths of instructions, e.g., with such prefixes referred to as length changing prefixes (LCPs). In certain embodiments, these length characteristics can be ignored in an OD-ILD circuit 112 implementation. For example, to prevent the decoder circuit 124A from detecting a series of incorrect predict bits and flushing the pipeline, the decoder circuit 12A (e.g., instruction length verification circuitry 120) detects an LCP and does not attempt to force OD-ILD circuit 112 engagement. Furthermore, whenever LCP prefixes are detected when the OD-ILD circuit is already engaged, the OD-ILD controller 204 causes bypassing of predecode bits from the predecode cache 110 instead of sending (e.g., "garbage") down the pipeline.

Certain embodiments of circuitry 200 are utilized with a clustered front end, e.g., decode clusters depicted in FIG. 1. In certain embodiments, an OD-ILD circuit 112 (e.g., and one or more other components) is deployed on each decoder cluster. In certain embodiments, a single OD-ILD circuit services all decode clusters.

FIG. 3 is a block diagram illustrating an example format of a predecode cache 110 according to embodiments of the disclosure. In certain embodiments, each entry (e.g., entry 306) in predecode cache 110 is for a corresponding section (e.g., cache line) of instruction data (e.g., an entry) in the (e.g., L1) instruction cache 106 (e.g., 64 B), for example, as a multiple (e.g., 32) entry 302 and multiple (e.g., 4) way 304 cache.

Continuing the address 0x105C example above, in certain embodiments there are (e.g., at least) three cache lines worth of instruction data stored into instruction cache 106: a first cache line (e.g., 64 Bytes) of instruction data starting at address 0x1000, a second cache line (e.g., 64 Bytes) of instruction data starting at address 0x1040, and a third cache line (e.g., 64 Bytes) of instruction data starting at address 0x1080. In certain embodiments, as the starting address of a potential instruction is for address 0x105C of cache line having addresses of 0x1040-0x107F, only those sections (e.g., bytes) between address 0x105C and address 0x107F have corresponding predecode bits generated (e.g., via OD-ILD circuit 112), and thus those bits are valid (e.g., correct) and any predecode bits for the other sections (e.g., bytes) between address 0x1040 and 0x105B are invalid (e.g., missing).

Figure 4:
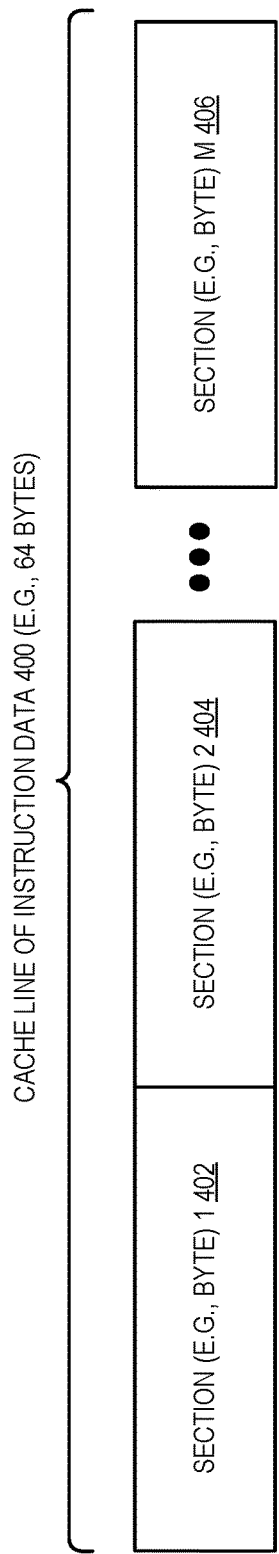
FIG. 4 illustrates an example format of a cache line of instruction data according to embodiments of the disclosure.

FIG. 4 illustrates an example format of a cache line of instruction data 400 according to embodiments of the disclosure. In certain embodiments, cache line of instruction data 400 (e.g., 64B) is formed from multiple sections (e.g., bytes) of instruction data (e.g., from section 1 402, section 2 404, and to section M 406, e.g., where M is any number 2 or greater), e.g., but stored as a single entry in instruction cache 106.

FIG. 5 illustrates an example format of a predecode cache entry 500 according to embodiments of the disclosure. In certain embodiments, predecode cache entry 500 includes multiple bits (e.g., bit 1 502, bit 2 504, and bit M 506, e.g., where M is any number 2 or greater) and each bit represents a corresponding section of a cache line of instruction data (e.g., cache line of instruction data 400 where M is the same number for both format 400 and format 500).

Continuing the address 0x105C example above, in certain embodiments each cache line is 64 Bytes and thus the corresponding predecode cache entry 500 is to have 64 bits, e.g., with each bit indicating if a corresponding byte of the 64 Bytes cache line is a last (e.g., end) byte of an instruction (e.g., EOM).

FIG. 6 is a block diagram illustrating an example format of an incomplete decode table 116 according to embodiments of the disclosure. In certain embodiments, each entry in incomplete decode table 116 represents a single cache line, for example, as a multiple (e.g., 32) entry 602 and multiple (e.g., 4) way 604 table. In certain embodiments, each entry in incomplete decode table is for a corresponding entry in predecode cache 110 and/or is for a corresponding section (e.g., cache line) of instruction data (e.g., an entry) in the (e.g., L1) instruction cache 106 (e.g., 64 B). In certain embodiments, each entry is identified (e.g., indexed) by the address (or a proper subset of the address or addresses) of the corresponding instruction. The granularity of the proper subset of sections (e.g., bytes) may be one to one, or one to many (e.g., as shown in entry 608). In one embodiment, each cache line is 64 bytes, and the IDT uses a bit to represent every 8 bytes, e.g., where if a bit is "0" that indicates that portion of the cache line does not have known valid bits in predecode cache (e.g., those predecode bits are presumed invalid) and where if a bit is "1" that indicates that portion of the cache line has known valid bits in predecode cache (e.g., those predecode bits are presumed valid).

Continuing the address 0x105C example above, in certain embodiments there are (e.g., at least) three cache lines worth of instruction data stored into instruction cache 106: a first cache line (e.g., 64 Bytes) of instruction data starting at address 0x1000, a second cache line (e.g., 64 Bytes) of instruction data starting at address 0x1040, and a third cache line (e.g., 64 Bytes) of instruction data starting at address 0x1080, and thus entry 606, 608, and entry 610 in incomplete decode table 116, respectively. In certain embodiments, as the starting address of a potential instruction is for address 0x105C in the cache line having addresses of 0x1040-0x107F, those sections (e.g., bytes) between address 0x105C and address 0x107F have corresponding predecode bits in predecode cache 110 that are (e.g., presumed) valid (e.g., via OD-ILD circuit 112) and thus the corresponding bits (indexed from right to left as bit positions 7-3) in entry 608 are marked with a valid (e.g., "1") and those sections (e.g., bytes) between address 0x1040 and address 0x105B have corresponding predecode bits in predecode cache 110 that are (e.g., presumed) invalid (e.g., not updated via OD-ILD circuit 112) and thus the corresponding bits (indexed from left to right as bit positions 2-0) in entry 608 are marked with an invalid (e.g., "0") (e.g., not known to be valid) for the three following 8 byte regions (i) 0x1040-0x1047, (ii) 0x1048-0x104F, and (iii) 0x1050-0x1057 (e.g., because 0x105C has valid bits, the entire 8 byte region is marked as valid so 0x1058-0x105F would be marked as valid).

Figure 7:
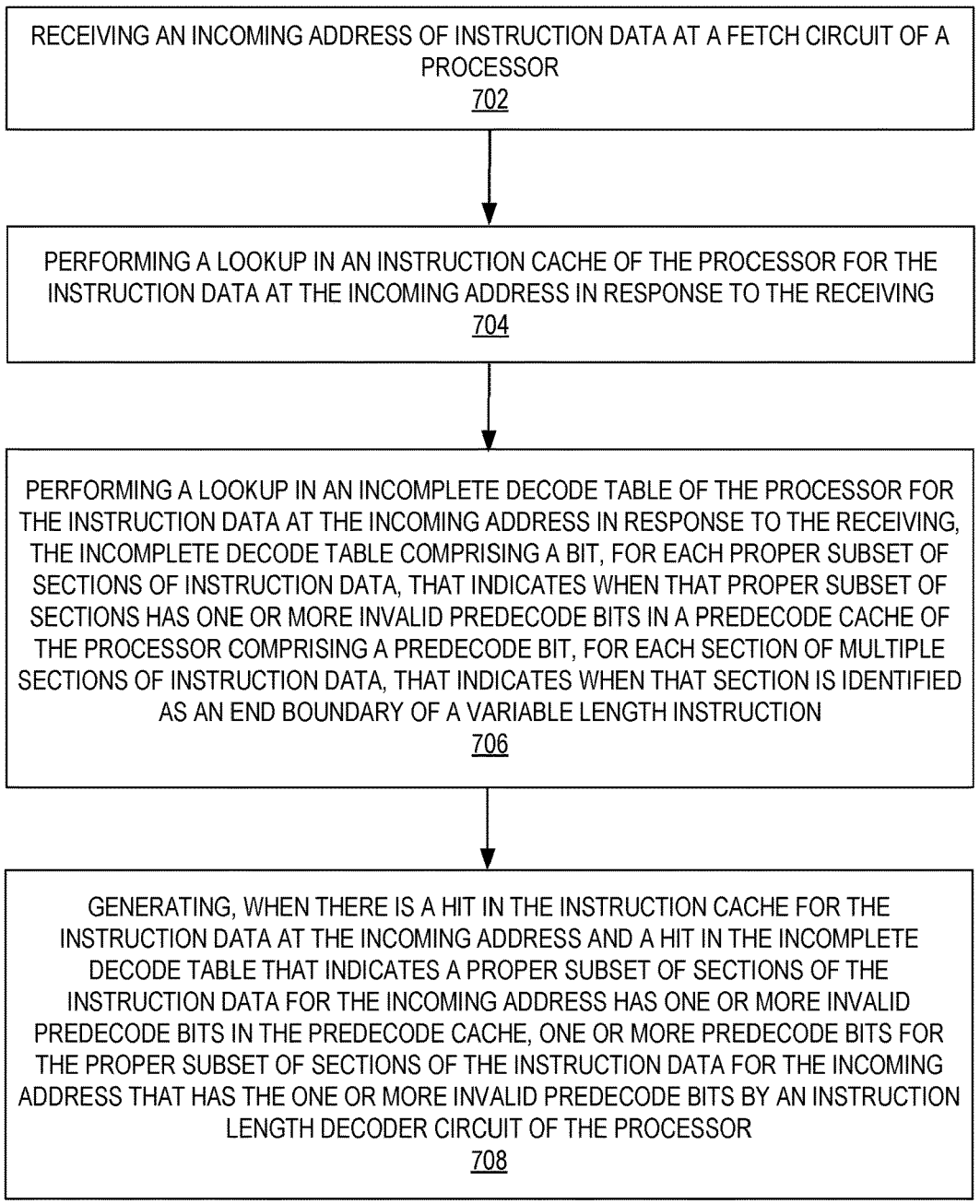
FIG. 7 is a block flow diagram illustrating operations of a method of generating one or more predecode bits according to embodiments of the disclosure.

FIG. 7 is a block flow diagram illustrating operations of a method of generating one or more predecode bits according to embodiments of the disclosure. Some or all of the operations 700 (or other processes described herein, or variations, and/or combinations thereof) are performed under the control of a processor core (for example, circuitry 200 thereof, e.g., OD-ILD controller 204). The operations 700 include, at block 702, receiving an incoming address of instruction data at a fetch circuit of a processor. The operations 700 further include, at block 704, performing a lookup in an instruction cache of the processor for the instruction data at the incoming address in response to the receiving. The operations 700 further include, at block 706, performing a lookup in an incomplete decode table of the processor for the instruction data at the incoming address in response to the receiving, the incomplete decode table comprising a bit, for each proper subset of sections of instruction data, that indicates when that proper subset of sections has one or more invalid predecode bits in a predecode cache of the processor comprising a predecode bit, for each section of multiple sections of instruction data, that indicates when that section is identified as an end boundary of a variable length instruction. The operations 700 further include, at block 708, generating, when there is a hit in the instruction cache for the instruction data at the incoming address and a hit in the incomplete decode table that indicates a proper subset of sections of the instruction data for the incoming address has one or more invalid predecode bits in the predecode cache, one or more predecode bits for the proper subset of sections of the instruction data for the incoming address that has the one or more invalid predecode bits by an instruction length decoder circuit of the processor Exemplary architectures, systems, etc. that the above may be used in are detailed below.

At least some embodiments of the disclosed technologies can be described in view of the following examples:

Example 1

A hardware processor core comprising:
a decoder circuit to decode instructions into decoded instructions;
an execution circuit to execute the decoded instructions;
an instruction cache;
an instruction length decoder circuit;
a predecode cache comprising a predecode bit, for each section of multiple sections (e.g., each having a same width) of instruction data, that indicates when that section is identified as a boundary of a variable length instruction;
an incomplete decode table comprising a bit, for each proper subset of sections of instruction data, that indicates when that proper subset of sections has one or more invalid predecode bits in the predecode cache; and a fetch circuit to, for an incoming address of instruction data, perform a lookup in the instruction cache and the incomplete decode table, and, when there is a hit in the instruction cache for the instruction data at the incoming address and a hit in the incomplete decode table that indicates a proper subset of sections of the instruction data for the incoming address has one or more invalid predecode bits in the predecode cache, causes the instruction length decoder circuit to generate one or more predecode bits for the proper subset of sections of the instruction data for the incoming address that has the one or more invalid predecode bits.

Example 2

The hardware processor core of example 1, wherein the instruction length decoder circuit is enabled from a disabled state when there is the hit in the instruction cache and the hit in the incomplete decode table.

Example 3

The hardware processor core of example 1, wherein, when there is the hit in the instruction cache and the hit in the incomplete decode table, the instruction length decoder circuit is to send the one or more predecode bits for the proper subset of sections of the instruction data for the incoming address to the decoder circuit.

Example 4

The hardware processor core of example 1, wherein, when there is the hit in the instruction cache and the hit in the incomplete decode table, the instruction length decoder circuit is to store the one or more predecode bits in the predecode cache and update one or more corresponding bits in the incomplete decode table as valid.

Example 5

The hardware processor core of example 1, wherein, when there is a miss in the instruction cache for the instruction data at the incoming address, the fetch circuit causes a fetch of the instruction data from memory, the instruction length decoder circuit to generate one or more predecode bits for the instruction data at the incoming address, and an update of one or more corresponding bits in the incomplete decode table as valid.

Example 6

The hardware processor core of example 1, wherein the decoder circuit comprises instruction length verification circuitry that updates a counter with a number of incorrect predecode bits from the predecode cache for decoded instructions, and when the counter exceeds a threshold, enables the instruction length decoder circuit from a disabled state.

Example 7

The hardware processor core of example 1, further comprising disable logic circuitry to perform a comparison of predecode bits from the predecode cache to corresponding predecode bits generated by the instruction length decoder circuit, and disable the instruction length decoder circuit from an enabled state when the comparison indicates matches exceed a disengagement threshold number of matches.

Example 8

The hardware processor core of example 1, wherein the fetch circuit is to, when there is a hit in the instruction cache for the instruction data at the incoming address and a miss in the incomplete decode table that indicates a proper subset of sections of the instruction data for the incoming address has one or more valid predecode bits in the predecode cache, causes the one or more valid predecode bits for the proper subset of sections of the instruction data for the incoming address from the predecode cache and corresponding instruction data from the instruction cache to be sent to the decoder circuit.

Example 9

A method comprising:
receiving an incoming address of instruction data at a fetch circuit of a processor;
performing a lookup in an instruction cache of the processor for the instruction data at the incoming address in response to the receiving;
performing a lookup in an incomplete decode table of the processor for the instruction data at the incoming address in response to the receiving, the incomplete decode table comprising a bit, for each proper subset of sections of instruction data, that indicates when that proper subset of sections has one or more invalid predecode bits in a predecode cache of the processor comprising a predecode bit, for each section of multiple sections of instruction data, that indicates when that section is identified as a boundary of a variable length instruction; and
generating, when there is a hit in the instruction cache for the instruction data at the incoming address and a hit in the incomplete decode table that indicates a proper subset of sections of the instruction data for the incoming address has one or more invalid predecode bits in the predecode cache, one or more predecode bits for the proper subset of sections of the instruction data for the incoming address that has the one or more invalid predecode bits by an instruction length decoder circuit of the processor.

Example 10

The method of example 9, further comprising enabling the instruction length decoder circuit from a disabled state when there is the hit in the instruction cache and the hit in the incomplete decode table.

Example 11

The method of example 9, further comprising send the one or more predecode bits for the proper subset of sections of the instruction data for the incoming address from the instruction length decoder circuit to a decoder circuit when there is the hit in the instruction cache and the hit in the incomplete decode table.

Example 12

The method of example 9, further comprising storing the one or more predecode bits from the instruction length decoder circuit into the predecode cache and updating one or more corresponding bits in the incomplete decode table as valid when there is the hit in the instruction cache and the hit in the incomplete decode table.

Example 13

The method of example 9, further comprising, when there is a miss in the instruction cache for the instruction data at the incoming address, fetching the instruction data from memory by the fetch circuit, generating one or more predecode bits for the instruction data at the incoming address by the instruction length decoder circuit, and updating one or more corresponding bits in the incomplete decode table as valid.

Example 14

The method of example 9, further comprising updating a counter with a number of incorrect predecode bits from the predecode cache for decoded instructions by instruction length verification circuitry of the processor, and enabling the instruction length decoder circuit from a disabled state when the counter exceeds a threshold.

Example 15

The method of example 9, further comprising performing a comparison of predecode bits from the predecode cache to corresponding predecode bits generated by the instruction length decoder circuit, and disabling the instruction length decoder circuit from an enabled state when the comparison indicates matches exceed a disengagement threshold number of matches.

Example 16

The method of example 9, wherein, when there is a hit in the instruction cache for the instruction data at the incoming address and a miss in the incomplete decode table that indicates a proper subset of sections of the instruction data for the incoming address has one or more valid predecode bits in the predecode cache, sending the one or more valid predecode bits for the proper subset of sections of the instruction data for the incoming address from the predecode cache and corresponding instruction data from the instruction cache to a decoder circuit.

Example 17

An apparatus comprising:
an instruction cache;
an instruction length decoder circuit;
a predecode cache comprising a predecode bit, for each section of multiple sections of instruction data, that indicates when that section is identified as a boundary of a variable length instruction;
an incomplete decode table comprising a bit, for each proper subset of sections of instruction data, that indicates when that proper subset of sections has one or more invalid predecode bits in the predecode cache; and
a circuit to, for an incoming address of instruction data, perform a lookup in the instruction cache and the incomplete decode table, and, when there is a hit in the instruction cache for the instruction data at the incoming address and a hit in the incomplete decode table that indicates a proper subset of sections of the instruction data for the incoming address has one or more invalid predecode bits in the predecode cache, causes the instruction length decoder circuit to generate one or more predecode bits for the proper subset of sections of the instruction data for the incoming address that has the one or more invalid predecode bits.

Example 18

The apparatus of example 17, wherein the instruction length decoder circuit is enabled from a disabled state when there is the hit in the instruction cache and the hit in the incomplete decode table.

Example 19

The apparatus of example 17, wherein, when there is the hit in the instruction cache and the hit in the incomplete decode table, the instruction length decoder circuit is to send the one or more predecode bits for the proper subset of sections of the instruction data for the incoming address to a decoder circuit that decodes instructions into decoded instructions for execution.

Example 20

The apparatus of example 17, wherein, when there is the hit in the instruction cache and the hit in the incomplete decode table, the instruction length decoder circuit is to store the one or more predecode bits in the predecode cache and update one or more corresponding bits in the incomplete decode table as valid.

Example 21

The apparatus of example 17, wherein, when there is a miss in the instruction cache for the instruction data at the incoming address, the circuit causes a fetch of the instruction data from memory, the instruction length decoder circuit to generate one or more predecode bits for the instruction data at the incoming address, and an update of one or more corresponding bits in the incomplete decode table as valid.

Example 22

The apparatus of example 17, further comprising instruction length verification circuitry that updates a counter with a number of incorrect predecode bits from the predecode cache for decoded instructions, and when the counter exceeds a threshold, enables the instruction length decoder circuit from a disabled state.

Example 23

The apparatus of example 17, wherein the circuit is to perform a comparison of predecode bits from the predecode cache to corresponding predecode bits generated by the instruction length decoder circuit, and disable the instruction length decoder circuit from an enabled state when the comparison indicates matches exceed a disengagement threshold number of matches.

Example 24

The apparatus of example 17, wherein the circuit is to, when there is a hit in the instruction cache for the instruction data at the incoming address and a miss in the incomplete decode table that indicates a proper subset of sections of the instruction data for the incoming address has one or more valid predecode bits in the predecode cache, causes the one or more valid predecode bits for the proper subset of sections of the instruction data for the incoming address from the predecode cache and corresponding instruction data from the instruction cache to be sent to a decoder circuit that decodes instructions into decoded instructions for execution.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
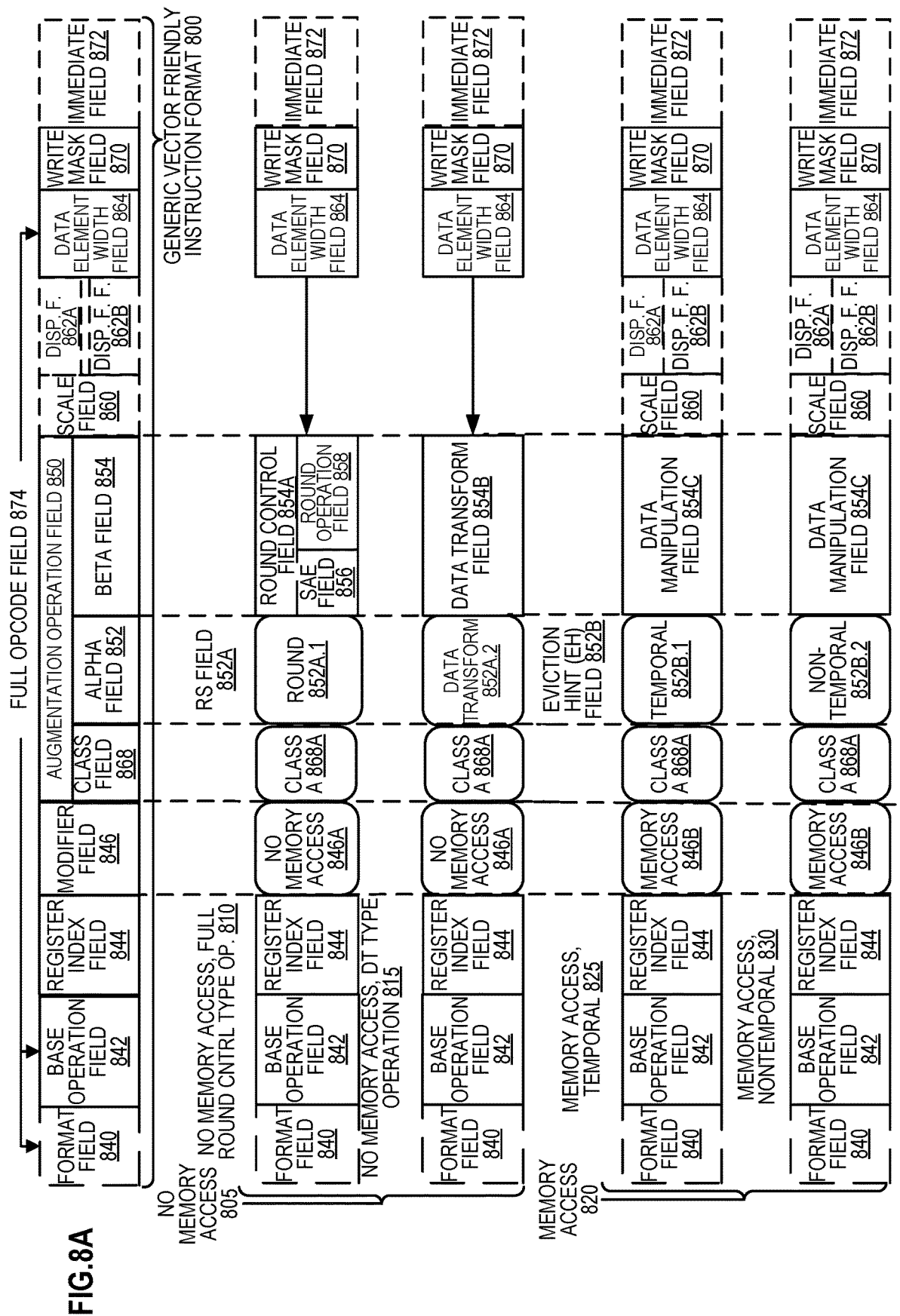
FIG. 8A is a block diagram illustrating a generic vector friendly instruction format and class A instruction templates thereof according to embodiments of the disclosure.
Figure 8B:
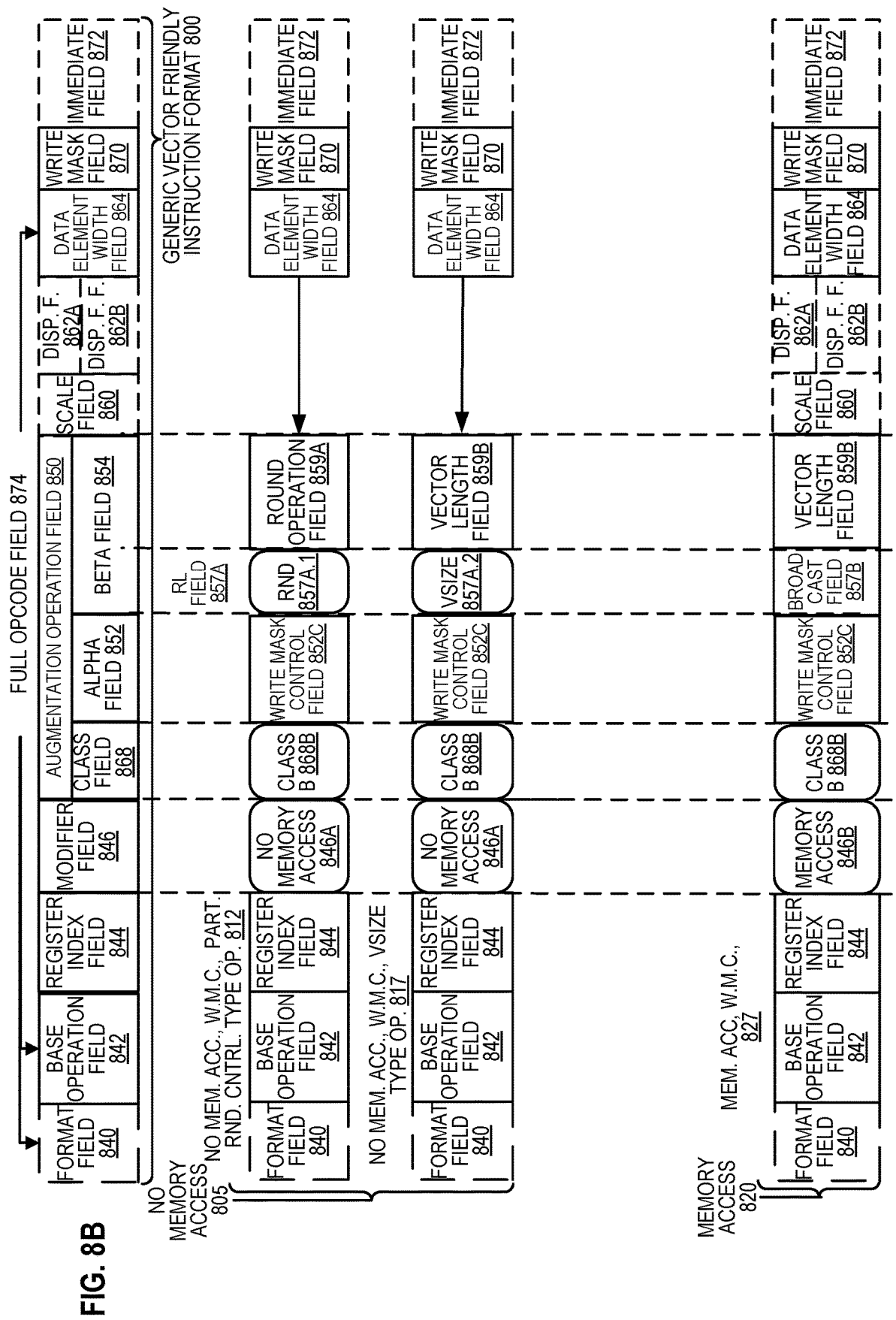
FIG. 8B is a block diagram illustrating the generic vector friendly instruction format and class B instruction templates thereof according to embodiments of the disclosure.

FIGS. 8A-8B are block diagrams illustrating a generic vector friendly instruction format and instruction templates thereof according to embodiments of the disclosure. FIG. 8A is a block diagram illustrating a generic vector friendly instruction format and class A instruction templates thereof according to embodiments of the disclosure; while FIG. 8B is a block diagram illustrating the generic vector friendly instruction format and class B instruction templates thereof according to embodiments of the disclosure. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the disclosure, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the disclosure are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale field 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the disclosure the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the disclosure where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale field 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the disclosure where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the disclosure. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the disclosure are described with reference to the specific vector friendly instruction format 900 in the context of the generic vector friendly instruction format 800 for illustrative purposes, the disclosure is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the disclosure is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the disclosure).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857 BEX byte 1, bit[5]—B). The EVEX.R, EVEX.X, and EVEX.B bit fields provide the same functionality as the corresponding VEX bit fields, and are encoded using it complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the disclosure. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the disclosure. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
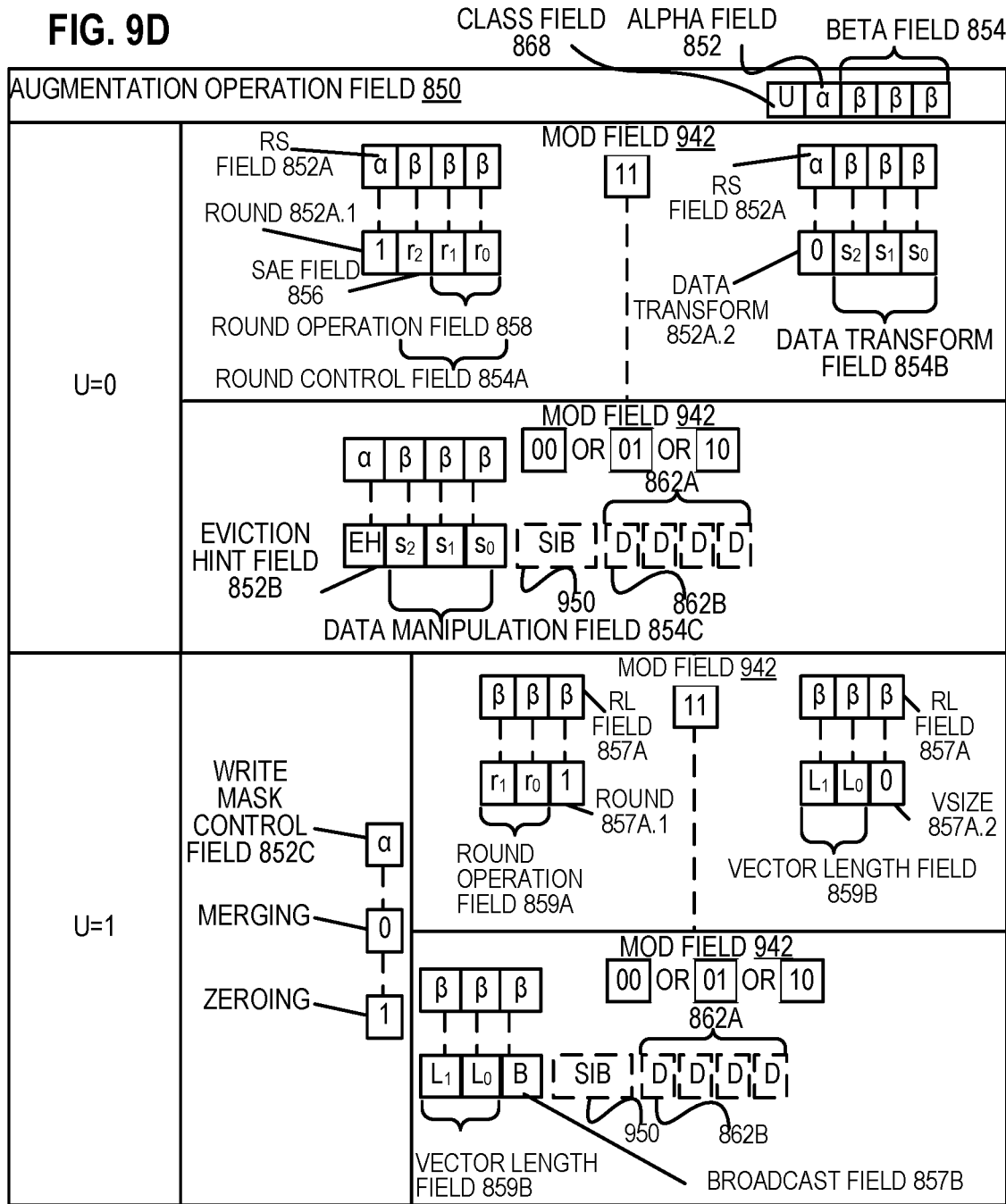
FIG. 9D is a block diagram illustrating the fields of the specific vector friendly instruction format in FIG. 9A that make up the augmentation operation field 850 according to one embodiment of the disclosure.

FIG. 9D is a block diagram illustrating the fields of the specific vector friendly instruction format 900 that make up the augmentation operation field 850 according to one embodiment of the disclosure. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2\_1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
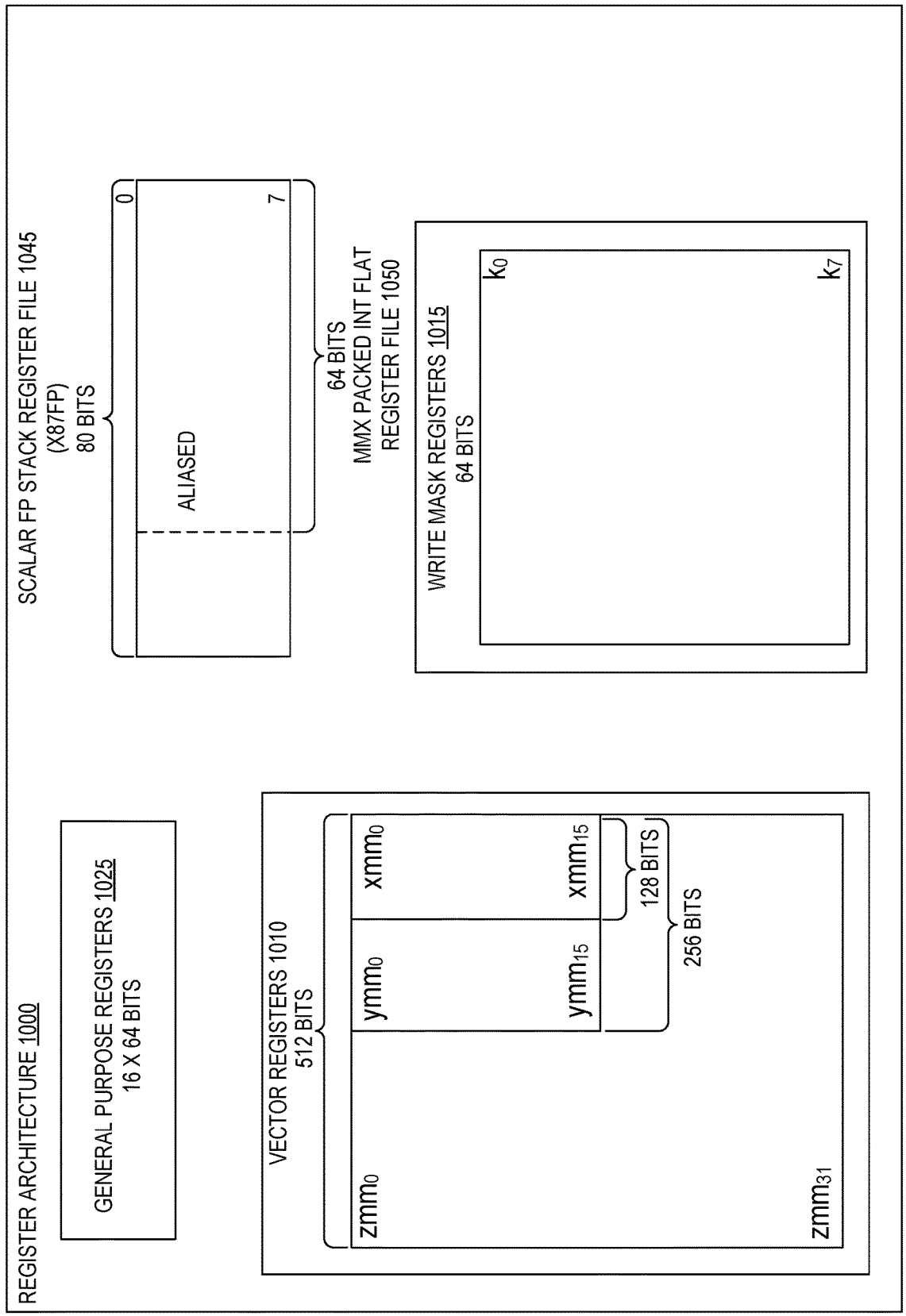
FIG. 10 is a block diagram of a register architecture according to one embodiment of the disclosure

FIG. 10 is a block diagram of a register architecture 1000 according to one embodiment of the disclosure. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macro-instructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

In certain embodiments, a prefetch circuit 1178 is included to prefetch data, for example, to predict access addresses and bring the data for those addresses into a cache or caches (e.g., from memory 1180).

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
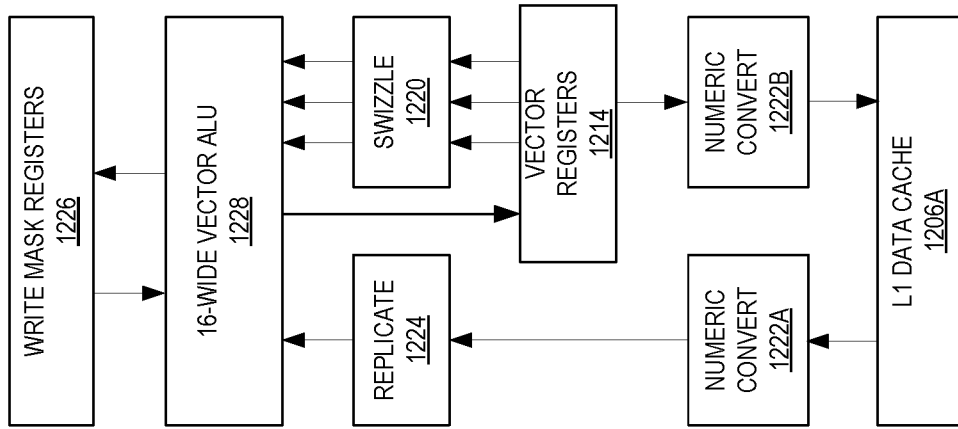
FIG. 12B is an expanded view of part of the processor core in FIG. 12A according to embodiments of the disclosure.
Figure 12A:
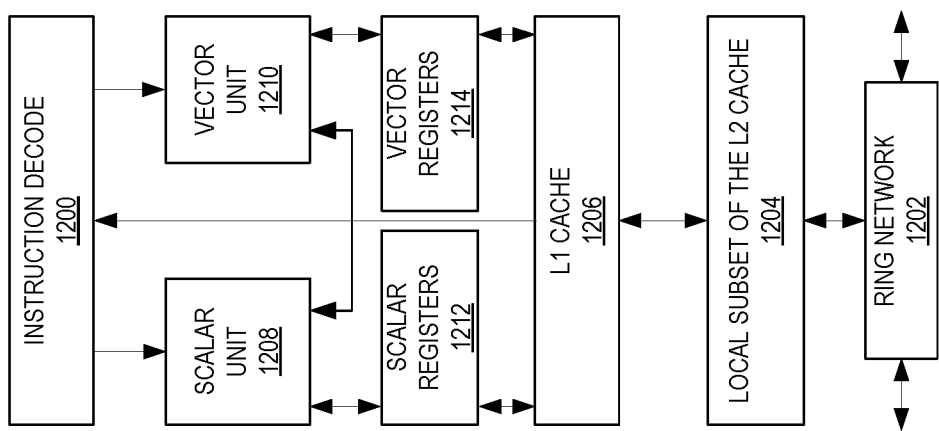
FIG. 12A is a block diagram of a single processor core, along with its connection to the on-die interconnect network and with its local subset of the Level 2 (L2) cache, according to embodiments of the disclosure.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the disclosure. In one embodiment, an instruction decode unit 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
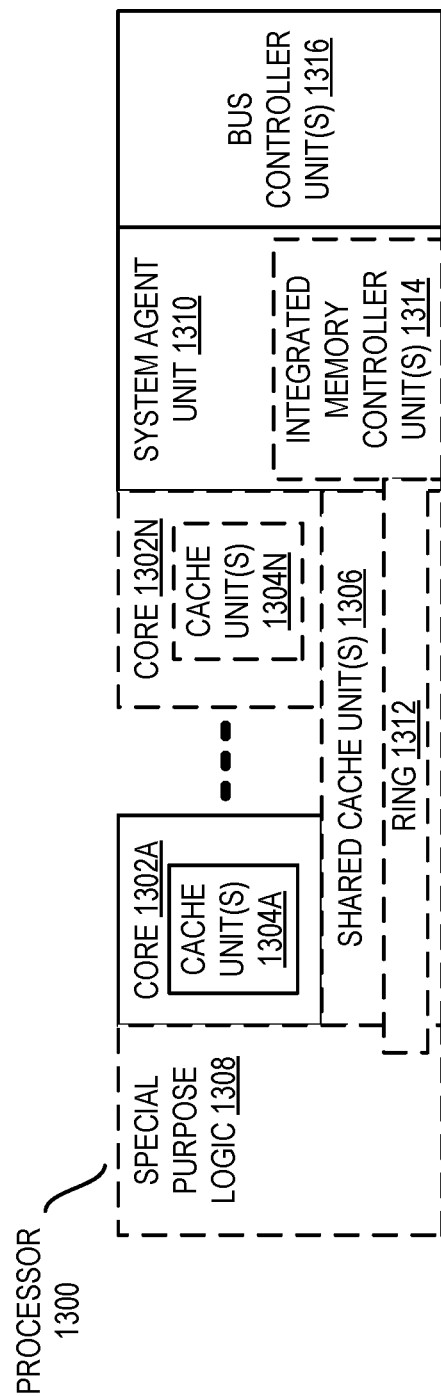
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
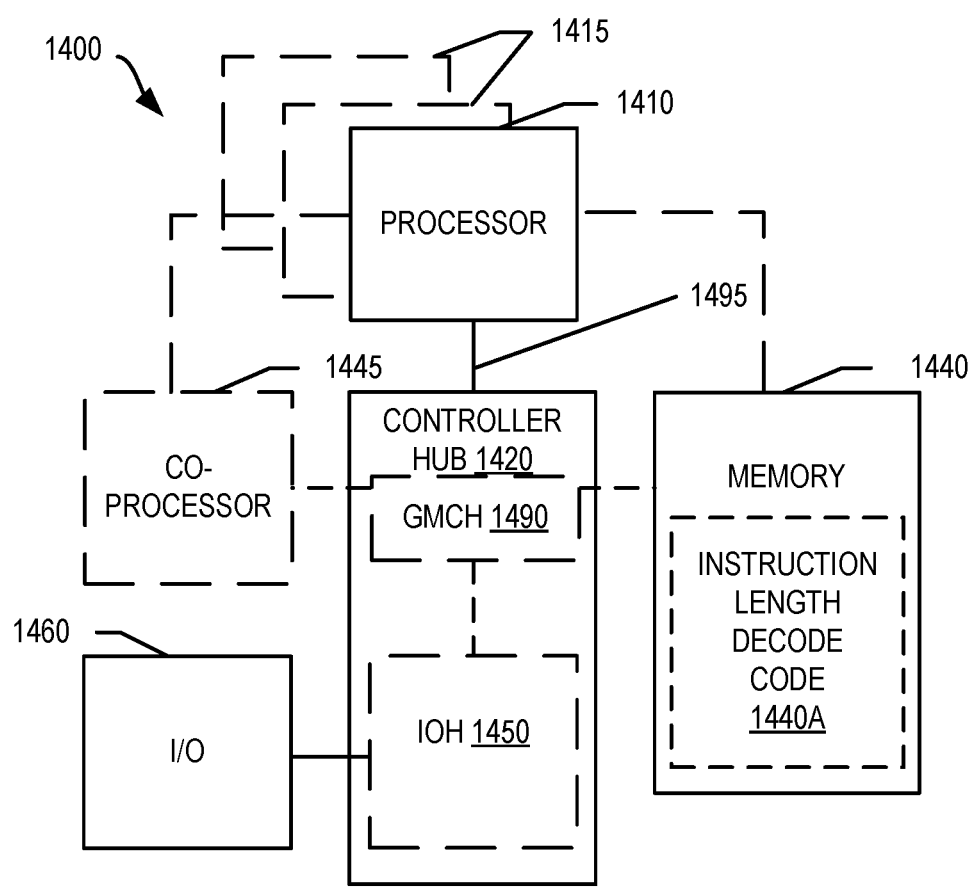
FIG. 14 is a block diagram of a system in accordance with one embodiment of the present disclosure.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450. Memory 1440 may include instruction length decode code 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as Quickpath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
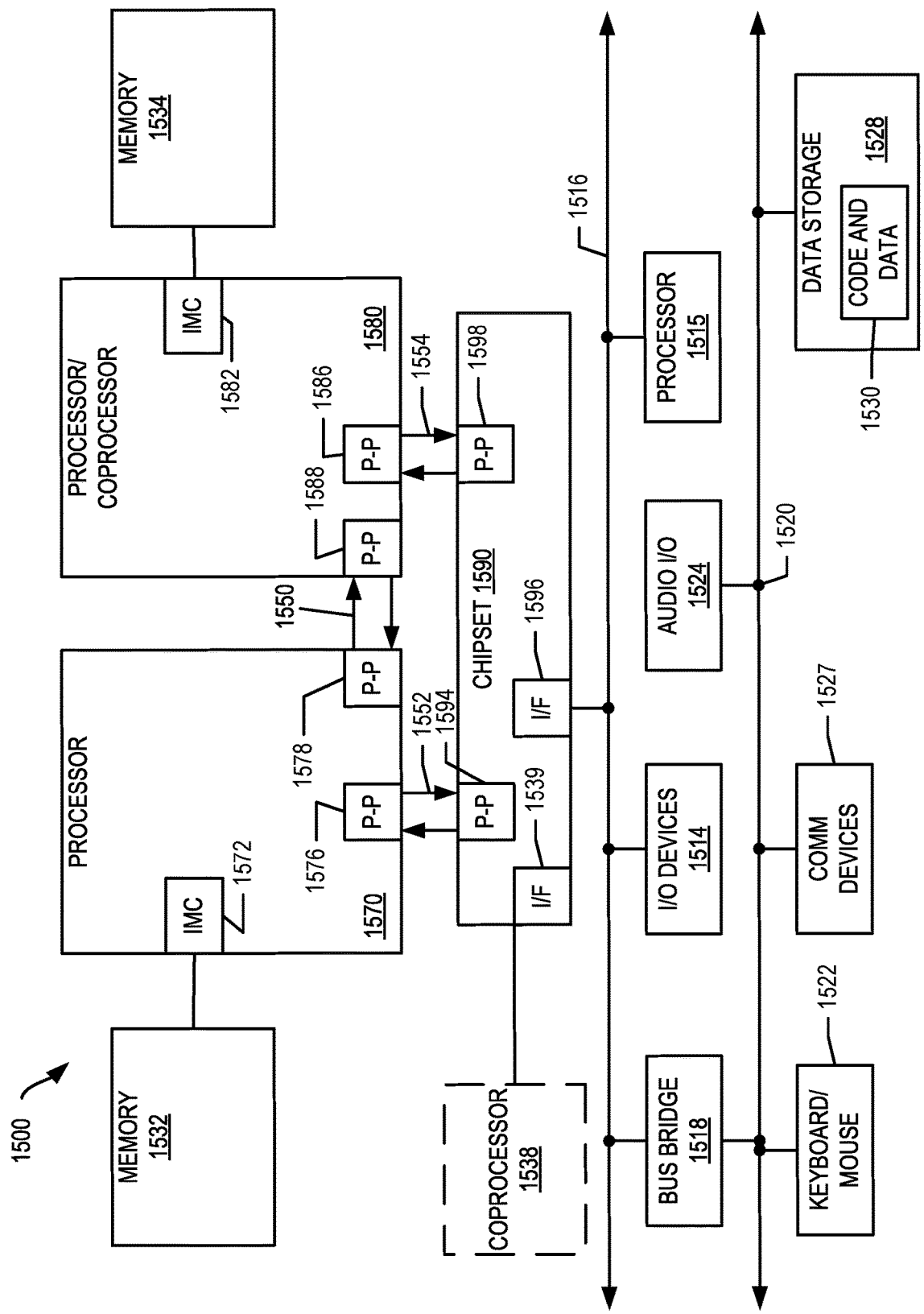
FIG. 15 is a block diagram of a more specific exemplary system in accordance with an embodiment of the present disclosure.

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
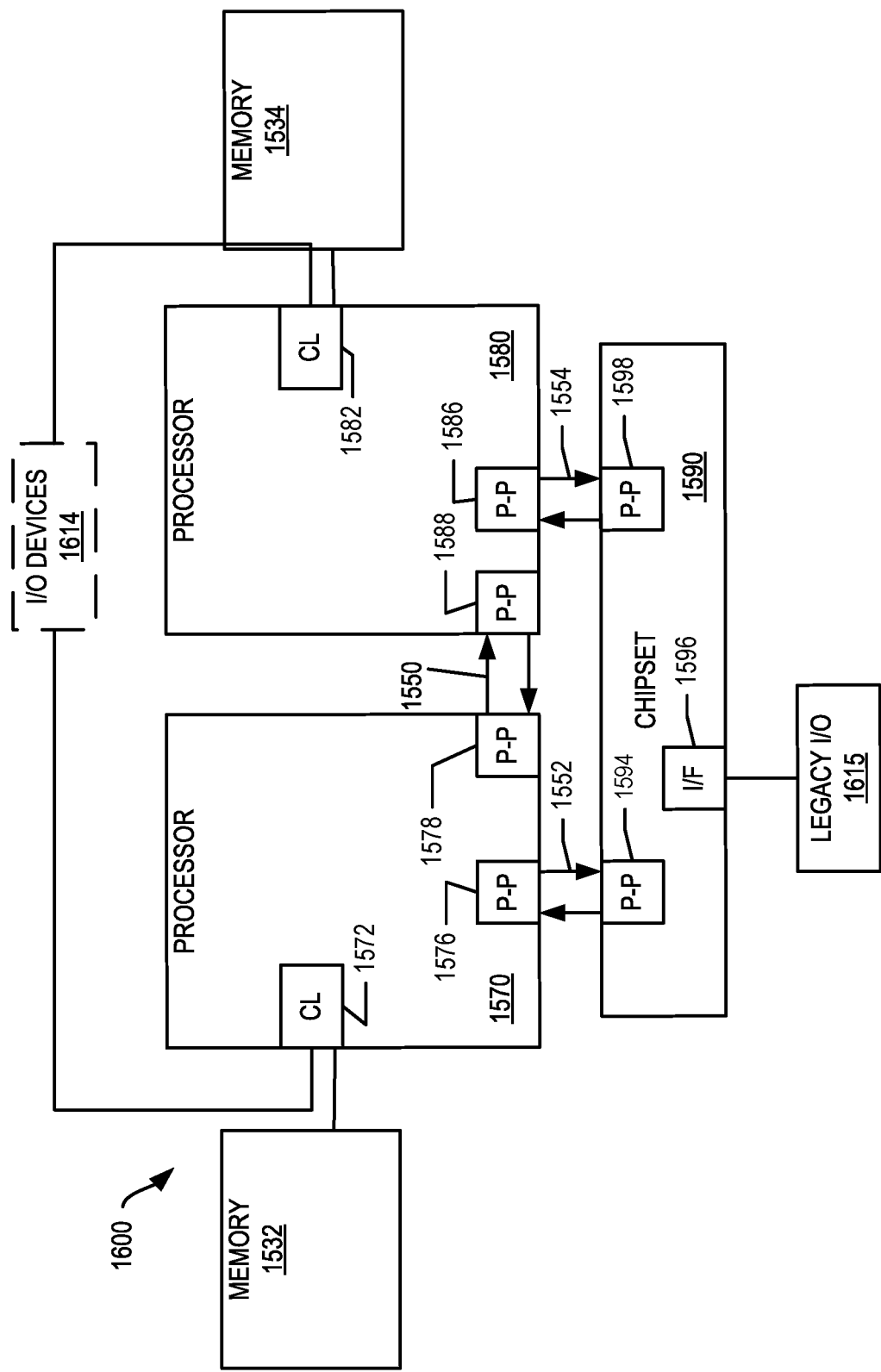
FIG. 16, shown is a block diagram of a second more specific exemplary system in accordance with an embodiment of the present disclosure.

Referring now to FIG. 16, shown is a block diagram of a second more specific exemplary system 1600 in accordance with an embodiment of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
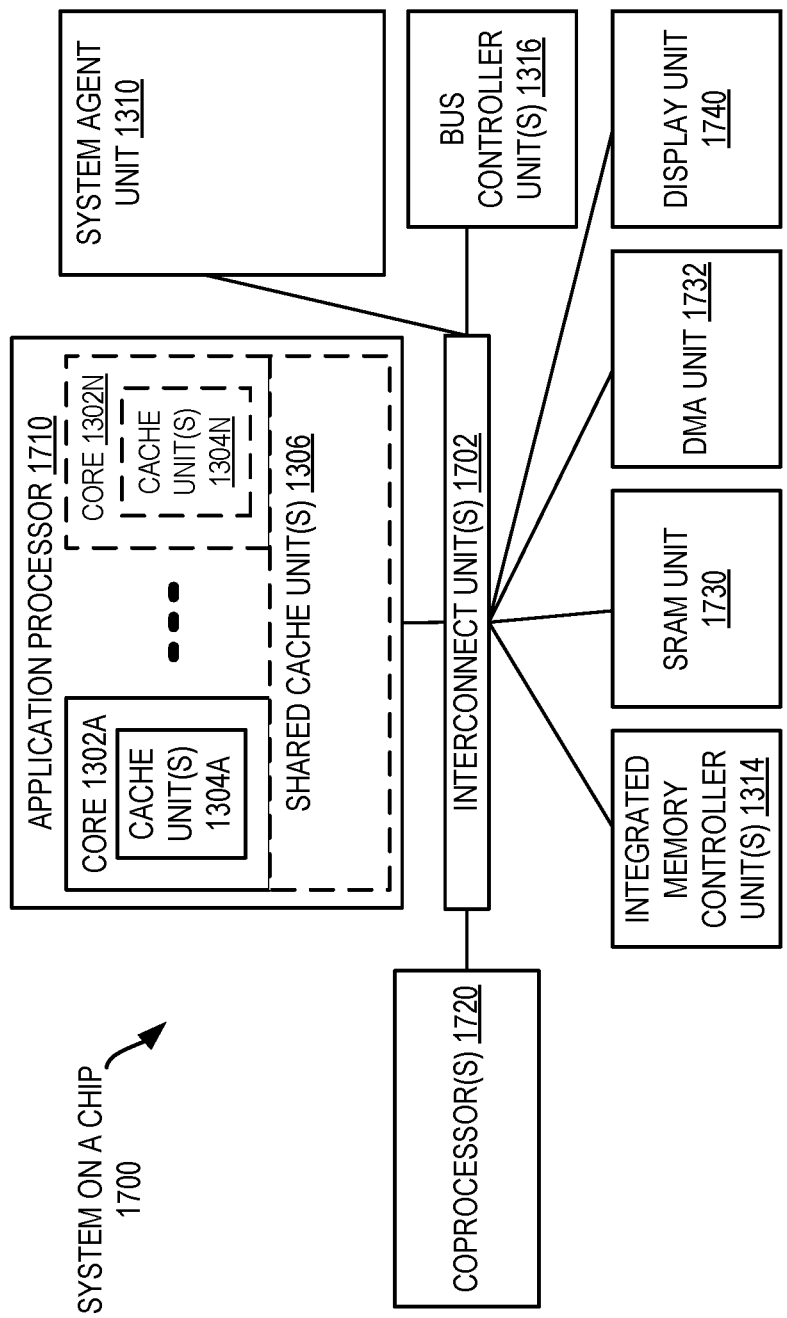
FIG. 17, shown is a block diagram of a system on a chip (SoC) in accordance with an embodiment of the present disclosure.

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
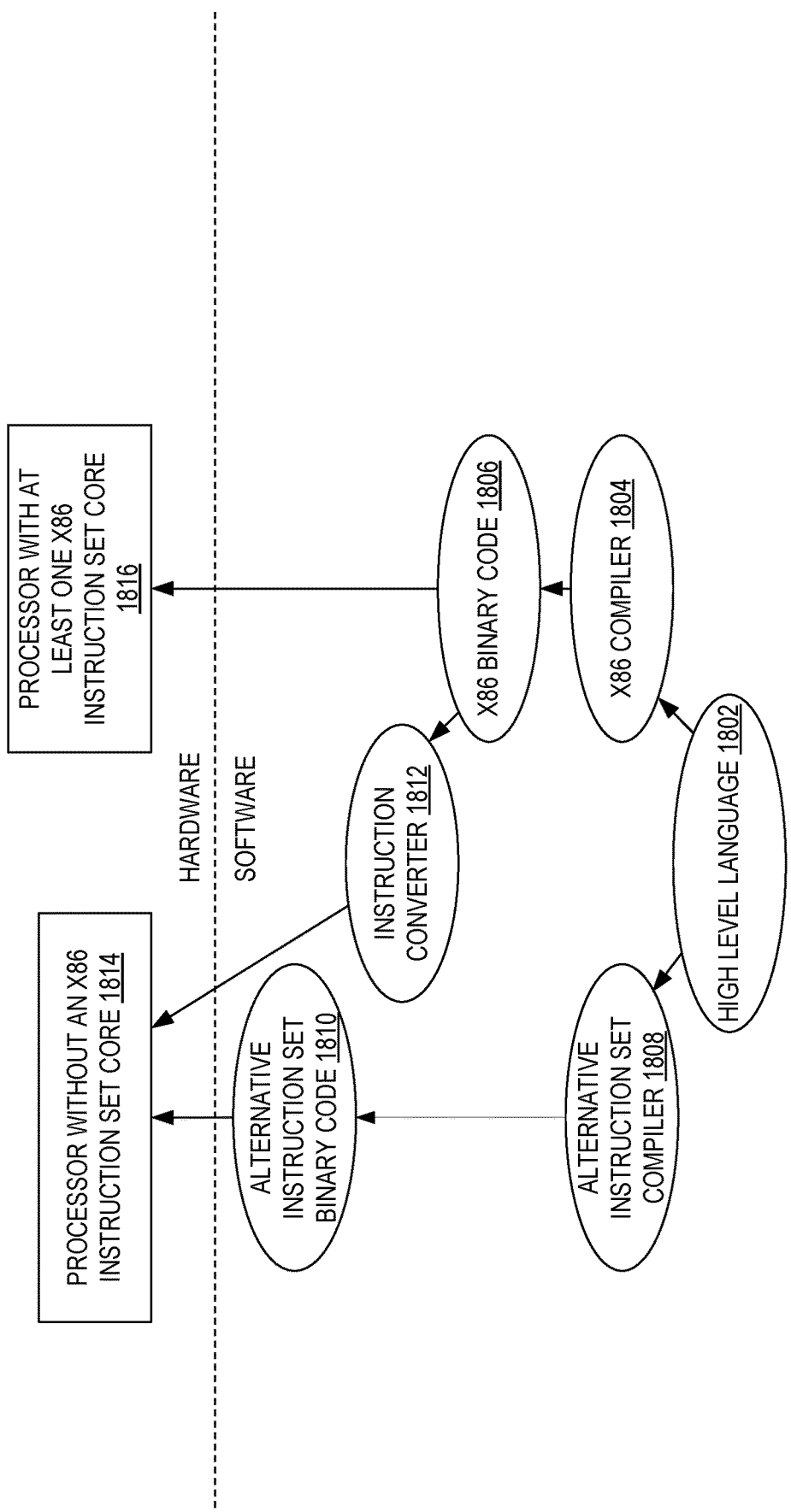
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A hardware processor core comprising:
a decoder circuit to decode instructions into decoded instructions;
an execution circuit to execute the decoded instructions;
an instruction cache;
an instruction length decoder circuit;
a predecode cache comprising a predecode bit, for each section of multiple sections of instruction data, that indicates when that section is identified as a boundary of a variable length instruction;
storage for an incomplete decode table comprising a single bit, for each proper subset of the multiple sections of the instruction data, that indicates when that proper subset of the multiple sections has one or more invalid predecode bits in the predecode cache; and
a fetch circuit to, for an incoming address of the instruction data, perform a lookup in the instruction cache and the incomplete decode table, and, when there is a hit in the incomplete decode table that indicates a first proper subset of the multiple sections of the instruction data for the incoming address has the one or more invalid predecode bits in the predecode cache and a hit in the instruction cache for the instruction data at the incoming address, cause the instruction length decoder circuit to generate one or more predecode bits for the first proper subset of the multiple sections of the instruction data for the incoming address that has the one or more invalid predecode bits.

2. The hardware processor core of claim 1, wherein the instruction length decoder circuit is enabled from a disabled state when there is the hit in the instruction cache and the hit in the incomplete decode table.

3. The hardware processor core of claim 1, wherein, when there is the hit in the instruction cache and the hit in the incomplete decode table, the instruction length decoder circuit is to send the one or more predecode bits for the first proper subset of the multiple sections of the instruction data for the incoming address to the decoder circuit.

4. The hardware processor core of claim 1, wherein, when there is the hit in the instruction cache and the hit in the incomplete decode table, the instruction length decoder circuit is to store the one or more predecode bits in the predecode cache and update one or more corresponding bits in the incomplete decode table as valid.

5. The hardware processor core of claim 1, wherein, when there is a miss in the instruction cache for the instruction data at the incoming address, the fetch circuit causes:
a fetch of the instruction data from memory;
the instruction length decoder circuit to generate one or more predecode bits for the instruction data at the incoming address; and
an update of one or more corresponding bits in the incomplete decode table as valid.

6. The hardware processor core of claim 1, wherein the decoder circuit comprises instruction length verification circuitry that updates a counter with a number of incorrect predecode bits from the predecode cache for decoded instructions, and when the counter exceeds a threshold, enables the instruction length decoder circuit from a disabled state.

7. The hardware processor core of claim 1, further comprising disable logic circuitry to perform a comparison of predecode bits from the predecode cache to corresponding predecode bits generated by the instruction length decoder circuit, and disable the instruction length decoder circuit from an enabled state when the comparison indicates matches exceed a disengagement threshold number of matches.

8. The hardware processor core of claim 1, wherein the fetch circuit is to, when there is a miss in the incomplete decode table that indicates the first proper subset of the multiple sections of the instruction data for the incoming address has one or more valid predecode bits in the predecode cache and a hit in the instruction cache for the instruction data at the incoming address, cause the one or more valid predecode bits for the first proper subset of the multiple sections of the instruction data for the incoming address from the predecode cache and corresponding instruction data from the instruction cache to be sent to the decoder circuit.

9. A method comprising:
receiving an incoming address of instruction data at a fetch circuit of a processor;
performing a lookup in an instruction cache of the processor for the instruction data at the incoming address in response to the receiving;
performing a lookup in an incomplete decode table of the processor for the instruction data at the incoming address in response to the receiving, the incomplete decode table comprising a single bit, for each proper subset of multiple sections of the instruction data, that indicates when that proper subset of the multiple sections has one or more invalid predecode bits in a predecode cache of the processor comprising a predecode bit, for each section of the multiple sections of the instruction data, that indicates when that section is identified as a boundary of a variable length instruction; and
generating, when there is a hit in the incomplete decode table that indicates a first proper subset of the multiple sections of the instruction data for the incoming address has the one or more invalid predecode bits in the predecode cache and a hit in the instruction cache for the instruction data at the incoming address, one or more predecode bits for the first proper subset of the multiple sections of the instruction data for the incoming address that has the one or more invalid predecode bits by an instruction length decoder circuit of the processor.

10. The method of claim 9, further comprising enabling the instruction length decoder circuit from a disabled state when there is the hit in the instruction cache and the hit in the incomplete decode table.

11. The method of claim 9, further comprising sending the one or more predecode bits for the first proper subset of the multiple sections of the instruction data for the incoming address from the instruction length decoder circuit to a decoder circuit when there is the hit in the instruction cache and the hit in the incomplete decode table.

12. The method of claim 9, further comprising storing the one or more predecode bits from the instruction length decoder circuit into the predecode cache and updating one or more corresponding bits in the incomplete decode table as valid when there is the hit in the instruction cache and the hit in the incomplete decode table.

13. The method of claim 9, further comprising, when there is a miss in the instruction cache for the instruction data at the incoming address, fetching the instruction data from memory by the fetch circuit, generating one or more predecode bits for the instruction data at the incoming address by the instruction length decoder circuit, and updating one or more corresponding bits in the incomplete decode table as valid.

14. The method of claim 9, further comprising updating a counter with a number of incorrect predecode bits from the predecode cache for decoded instructions by instruction length verification circuitry of the processor, and enabling the instruction length decoder circuit from a disabled state when the counter exceeds a threshold.

15. The method of claim 9, further comprising performing a comparison of predecode bits from the predecode cache to corresponding predecode bits generated by the instruction length decoder circuit, and disabling the instruction length decoder circuit from an enabled state when the comparison indicates matches exceed a disengagement threshold number of matches.

16. The method of claim 9, wherein, when there is a miss in the incomplete decode table that indicates the first proper subset of the multiple sections of the instruction data for the incoming address has one or more valid predecode bits in the predecode cache and a hit in the instruction cache for the instruction data at the incoming address, sending the one or more valid predecode bits for the first proper subset of the multiple sections of the instruction data for the incoming address from the predecode cache and corresponding instruction data from the instruction cache to a decoder circuit.

17. An apparatus comprising:
an instruction cache;
an instruction length decoder circuit;
a predecode cache comprising a predecode bit, for each section of multiple sections of instruction data, that indicates when that section is identified as a boundary of a variable length instruction;

storage for an incomplete decode table comprising a single bit, for each proper subset of multiple sections of the instruction data, that indicates when that proper subset of the multiple sections has one or more invalid predecode bits in the predecode cache; and a circuit to, for an incoming address of the instruction data, perform a lookup in the instruction cache and the incomplete decode table, and, when there is a hit in the incomplete decode table that indicates a first proper subset of the multiple sections of the instruction data for the incoming address has the one or more invalid predecode bits in the predecode cache and a hit in the instruction cache for the instruction data at the incoming address, cause the instruction length decoder circuit to generate one or more predecode bits for the first proper subset of the multiple sections of the instruction data for the incoming address that has the one or more invalid predecode bits.

18. The apparatus of claim 17, wherein the instruction length decoder circuit is enabled from a disabled state when there is the hit in the instruction cache and the hit in the incomplete decode table.

19. The apparatus of claim 17, wherein, when there is the hit in the instruction cache and the hit in the incomplete decode table, the instruction length decoder circuit is to send the one or more predecode bits for the first proper subset of the multiple sections of the instruction data for the incoming address to a decoder circuit that decodes instructions into decoded instructions for execution.

20. The apparatus of claim 17, wherein, when there is the hit in the instruction cache and the hit in the incomplete decode table, the instruction length decoder circuit is to store the one or more predecode bits in the predecode cache and update one or more corresponding bits in the incomplete decode table as valid.

21. The apparatus of claim 17, wherein, when there is a miss in the instruction cache for the instruction data at the incoming address, the circuit causes:

a fetch of the instruction data from memory;

the instruction length decoder circuit to generate one or more predecode bits for the instruction data at the incoming address; and an update of one or more corresponding bits in the incomplete decode table as valid.

22. The apparatus of claim 17, further comprising instruction length verification circuitry that updates a counter with a number of incorrect predecode bits from the predecode cache for decoded instructions, and when the counter exceeds a threshold, enables the instruction length decoder circuit from a disabled state.

23. The apparatus of claim 17, wherein the circuit is to perform a comparison of predecode bits from the predecode cache to corresponding predecode bits generated by the instruction length decoder circuit, and disable the instruction length decoder circuit from an enabled state when the comparison indicates matches exceed a disengagement threshold number of matches.

24. The apparatus of claim 17, wherein the circuit is to, when there is and a miss in the incomplete decode table that indicates the first proper subset of the multiple sections of the instruction data for the incoming address has one or more valid predecode bits in the predecode cache and a hit in the instruction cache for the instruction data at the incoming address, cause the one or more valid predecode bits for the first proper subset of the multiple sections of the instruction data for the incoming address from the predecode cache and corresponding instruction data from the instruction cache to be sent to a decoder circuit that decodes instructions into decoded instructions for execution.

* * * * *